(12) United States Patent
Motomura et al.

(10) Patent No.: US 8,139,076 B2
(45) Date of Patent: Mar. 20, 2012

(54) SYSTEM, METHOD, AND PROGRAM FOR DETERMINING LUMINANCE VALUES OF MULTIPLE POLYGONS WHICH REPRESENT A SURFACE OF A SUBJECT

(75) Inventors: Hideto Motomura, Kyoto (JP); Yoshiyuki Okimoto, Nara (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/130,084

(22) PCT Filed: Aug. 30, 2010

(86) PCT No.: PCT/JP2010/005336
§ 371 (c)(1),
(2), (4) Date: May 19, 2011

(87) PCT Pub. No.: WO2011/027534
PCT Pub. Date: Mar. 10, 2011

(65) Prior Publication Data
US 2011/0221759 A1 Sep. 15, 2011

(30) Foreign Application Priority Data
Sep. 4, 2009 (JP) ................................. 2009-204997

(51) Int. Cl.
*G09G 5/00* (2006.01)
*G06T 13/00* (2011.01)
*G06T 17/00* (2006.01)

(52) U.S. Cl. .......................... 345/582; 345/473; 345/420

(58) Field of Classification Search .................. None
See application file for complete search history.

(56) References Cited

U.S. PATENT DOCUMENTS 5,369,736 A 11/1994 Kato et al.
6,072,496 A * 6/2000 Guenter et al. ............... 345/419
(Continued)

FOREIGN PATENT DOCUMENTS

JP 2003-090715 A 3/2003
(Continued)

OTHER PUBLICATIONS

Goesele, M. et al., A Framework for the Acquisition, Processing and Interactive Display of High Quality 3D Models, Tutorial Notes for ACM Solid Modeling 2002; Jun. 2002.*

(Continued)

*Primary Examiner* — Kee M Tung
*Assistant Examiner* — Carlos Perromat
(74) *Attorney, Agent, or Firm* — Renner, Otto, Boisselle & Sklar, LLP

(57) ABSTRACT

An image generating system determines respective luminance values of multiple polygons representing a surface of a subject rendered by reference to a texture image attached to the multiple polygons. The system includes a capturing section storing a texture image of an object deformed by external force; a memory section retaining a correspondence table including information about a position of one polygon set corresponding to a position on a surface of the object to which no external force is applied, information about a stress vector indicating external force applied to the position on the surface of the object and associated with the one polygon corresponding to the position on the surface of the object to which external force is applied, and information about the luminance value of the texture image of the object to which the external force is applied; and a texture mapping section making reference to the table.

16 Claims, 20 Drawing Sheets

U.S. PATENT DOCUMENTS

| | | | | |
|---|---|---|---|---|
| 6,606,095 | B1 * | 8/2003 | Lengyel et al. | 345/473 |
| 6,650,335 | B2 * | 11/2003 | Brand | 345/582 |
| 6,993,163 | B2 * | 1/2006 | Liu et al. | 382/118 |
| 7,969,447 | B2 * | 6/2011 | Scheepers et al. | 345/582 |

FOREIGN PATENT DOCUMENTS

| | | |
|---|---|---|
| JP | 2005-190261 A | 7/2005 |
| JP | 2008-117147 A | 5/2008 |

OTHER PUBLICATIONS

Shinji Araya, "Easily Understandable Three-Dimensional Computer Graphics", Kyoritsu Shuppan Co., Ltd., pp. 24-26, 127-132 and 144-146, 2003 [and partial English translation].

International Search Report for corresponding International Application No. PCT/JP2010/005336 mailed Sep. 21, 2010.

Shinji Araya, "Easily Understandable Three-Dimensional Computer Graphics", Kyoritsu Shuppan Co., Ltd., pp. 24-26, 127-132 and 144-146, 2003.

Tagawa et al., "Accuracy verification of dynamic cloth simulation by comparison with real cloth behavior in vacuum", Proceedings of the Virtual Reality Society of Japan Annual Conference, 7, 2002, pp. 361-364.

Tamura et al., "Development of Medical Training System Using Haptic Texture", VR Medicine, vol. 3., No. 1, 2004, pp. 30-37.

* cited by examiner

FIG.4
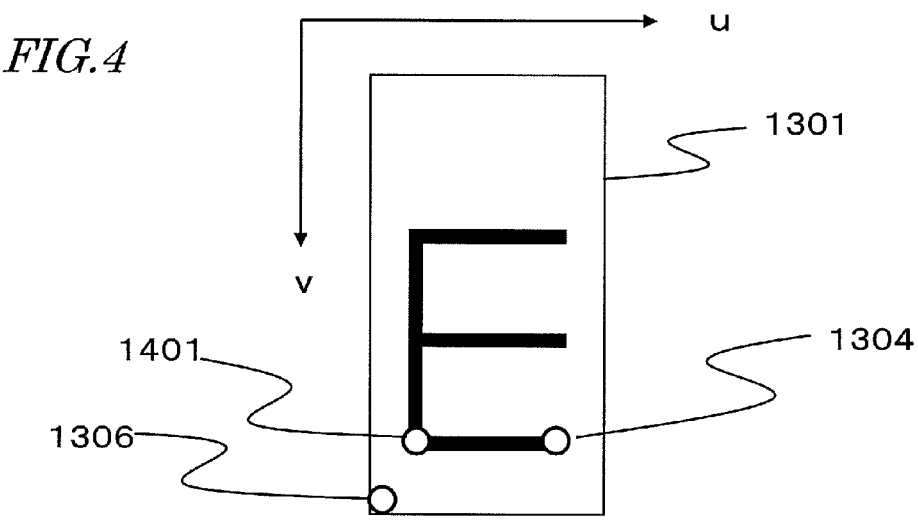
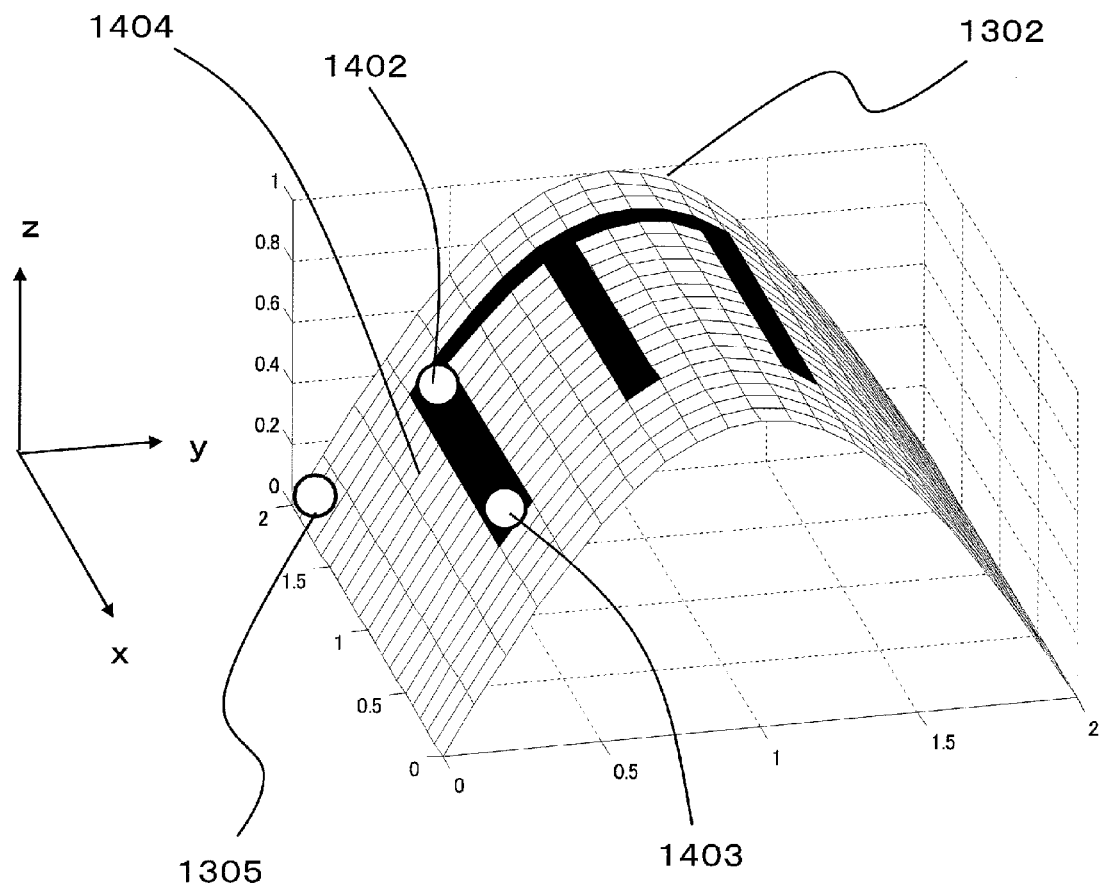

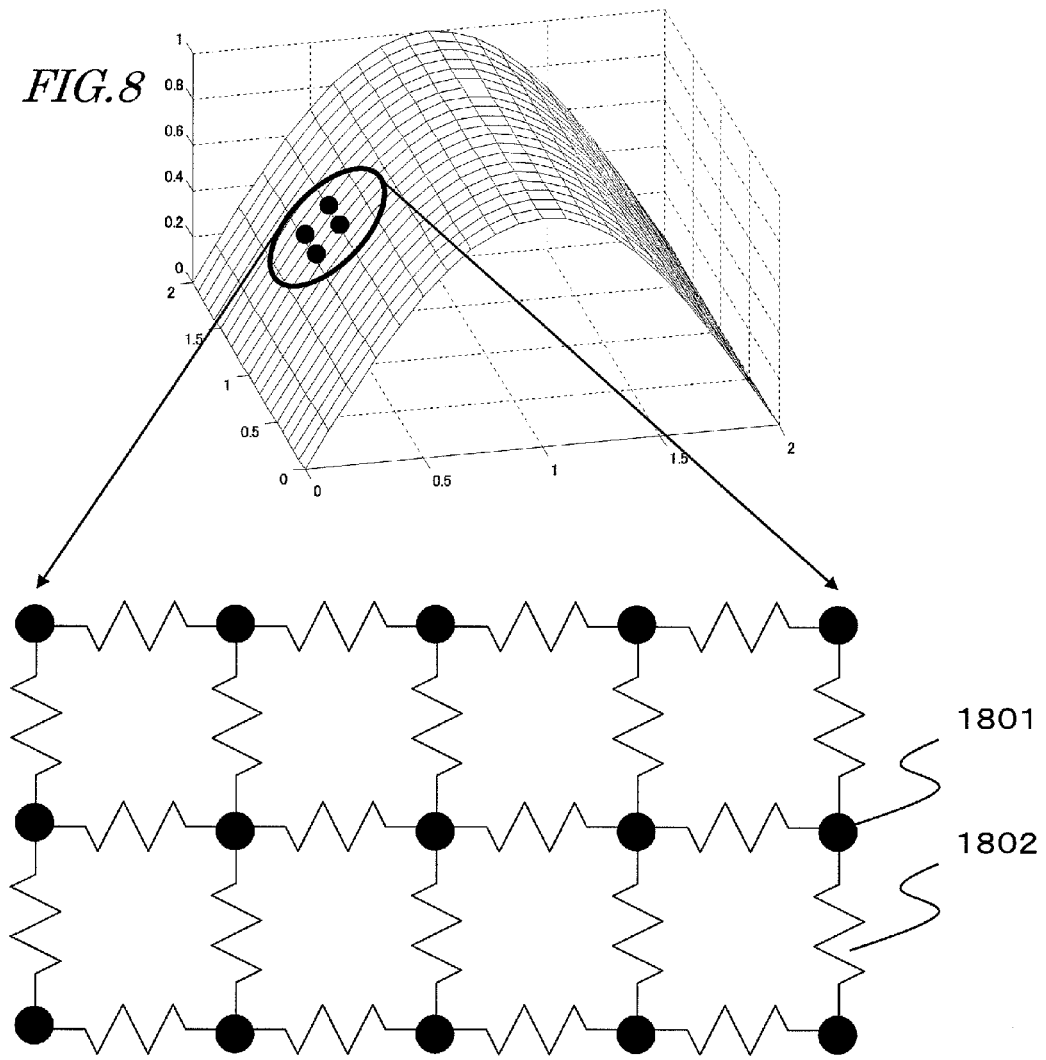
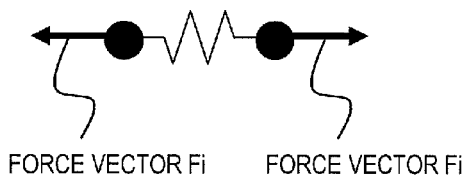
(A) IF SPRING IS COMPRESSED BY EXTERNAL FORCE
(B) IF SPRING IS EXTENDED BY EXTERNAL FORCE

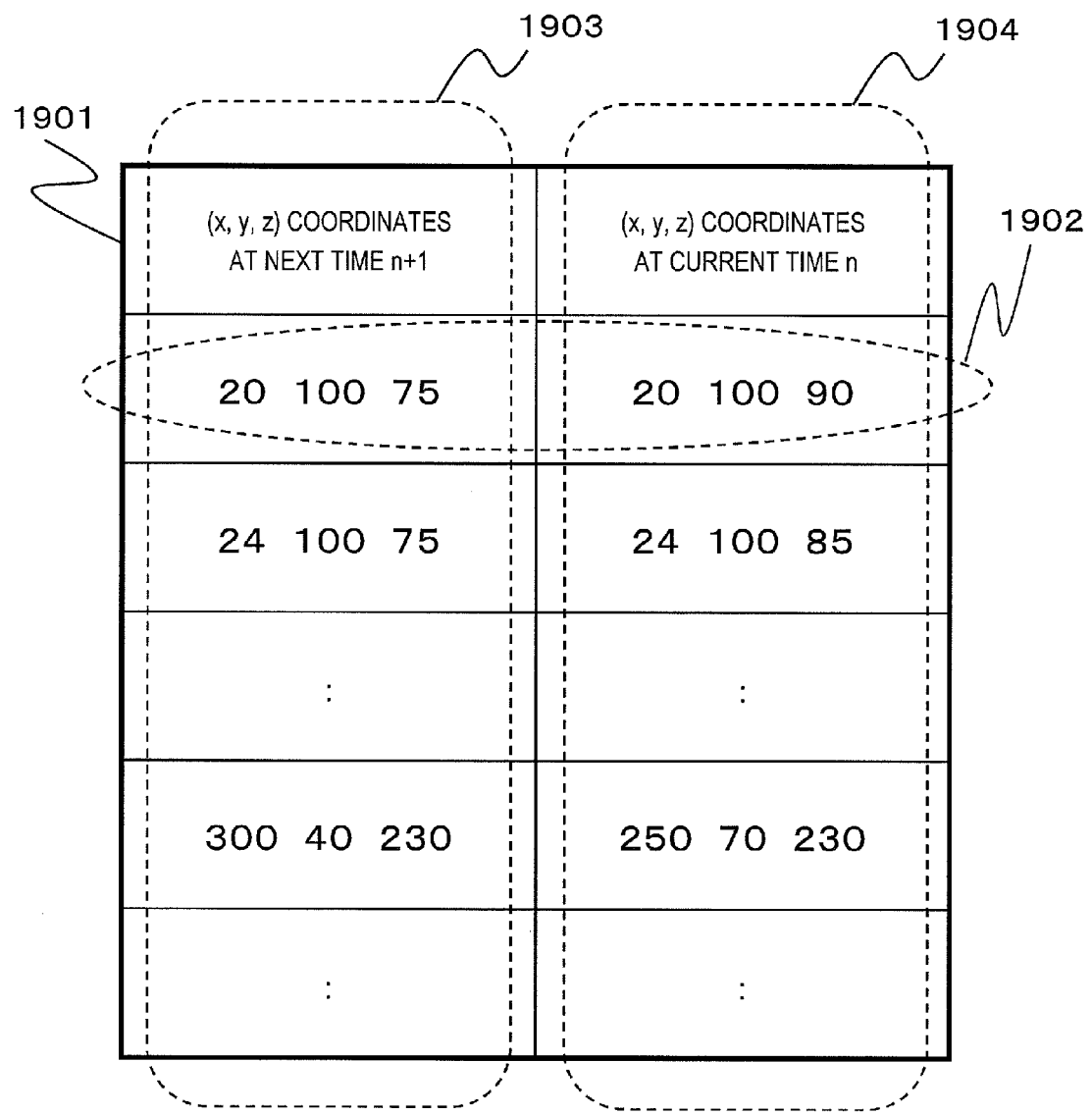

SYSTEM, METHOD, AND PROGRAM FOR DETERMINING LUMINANCE VALUES OF MULTIPLE POLYGONS WHICH REPRESENT A SURFACE OF A SUBJECT

TECHNICAL FIELD

The present invention relates to a texture mapping technology for use to generate computer graphics.

BACKGROUND ART

Recently, as the performances of computers have been further enhanced, a working environment that enables a person to create highly realistic computer graphics has almost been established. Among other things, the performance of a graphic processing unit (GPU) that is dedicated to graphic processing has been improved so significantly these days that a GPU with the ability to generate a moving picture in real time through computations is easily available now. Meanwhile, computer graphics have been used in more and more occasions lately and are now seen in any of various kinds of media that include not just movies but also ads on TV, the Internet and magazines, merchandise catalogs and simulation or reproduction video in news programs.

Specifically, in a merchandise catalog, an image or video representing a "product", which is an existent object, by computer graphics is placed. A number of advantages are achieved by using computer graphics. First of all, by using computer graphics, various constraints that would be imposed if the actual product had to be set in the right place for shooting can be eliminated. For example, if a running car needs to be filmed, it must be determined first where the car should run. In that case, in order to avoid ruining the advertising effect, the best location that will meet particular conditions needs to be found. On top of that, if the product should be actually shot, the weather would also be an important factor. Nevertheless, a prolonged shooting session would increase the overall cost and could affect the sales plan of the product. Furthermore, sometimes the advertising effect can be increased much more significantly by using video representation rather than shooting the actual product. For instance, even if video needs to be produced from an angle at which it would be dangerous to shoot the actual product, such video may be produced easily by using computer graphics.

Lately, various methods for generating computer graphics have been developed one after another. A so-called "texture mapping" technique is known as one of those various methods. The "texture mapping" is a technique for increasing the degree of reality of the appearance of an object represented by a computer by expressing the surface pattern and gloss of the object with more fidelity. That is to say, with the texture mapping technique, the "reality" of the object appearance can be increased so much that the object may look as if it were a real one. In this case, the "texture" is a generic term that refers collectively to the surface pattern, gloss and other looks of a given object. A texture mapping-related technology is disclosed in Non-Patent Document No. 1, for example.

FIG. 20 illustrates an exemplary texture mapping process. If an appropriate object surface texture 1002 is attached to a given object (e.g., a circular cylinder in this example) 1001 so as to fit its surface perfectly, a highly realistic image 1003 can be generated.

According to the texture mapping technology, when a texture represented as a two-dimensional image is attached to a three-dimensional object image, the luminance value of a normally rectangular texture image is changed according to the three-dimensional shape to represent. In the example illustrated in FIG. 20, the luminance value of the rectangular texture image 1002 is changed according to that of the side surface of the circular cylinder 1001. As a result, in the image 1003 thus generated, the luminance value of the rounded texture image that has been attached to the circular cylinder 1001 changes according to the shape of the circular cylinder 1001. As a result, unnaturalness can be eliminated from the appearance of the object represented. That is to say, a highly realistic image 1003 can be obtained.

A computer graphics image is supposed to be generated by getting the light that has been emitted from a light source reflected by a given object and by calculating, using a computer, the luminance value of a part of that light that has reached a particular viewpoint. To give a realistic texture to the surface of an object represented, ordinarily an image that has been actually shot with a digital camera or any other image capture device is used as a texture image and the luminance value of that actual shot is used.

Nevertheless, as a result of attempts to meet ever-growing demands for realistic appearance these days, it has turned to be more and more apparent that the resolution limit should be reached sooner or later if everything was calculated model based. For one thing, as the number of pixels to process has skyrocketed to meet the users' high-definition image expectations, the computational load has also increased tremendously. As a result, more and more people now know that there are some limits to the representation ability of the model based method.

Thus, considering the recent hugely expanding range of applications of computer graphics and rising demands for even more realistic representations, an image based technique, by which the object is actually shot or measured and used for texture mapping, has been used more and more often these days. And some people now regard the image based method as an indispensable technique for generating computer graphics.

CITATION LIST

Non-Patent Literature

Non-Patent Document No. 1: Shinji Araya, "Easily Understandable Three-Dimensional Computer Graphics", Kyoritsu Shuppan Co., Ltd., pp. 24-26, 127-132 and 144-146, 2003

SUMMARY OF INVENTION

Technical Problem

However, no texture mapping technology has ever been able to cope with a deformation of an object by external force. In other words, as long as the object stays in its predetermined shape, the luminance value of a texture image can be changed according to the conventional technologies. But no conventional technologies provide any means for changing the luminance value of a texture image in response to a deformation of the object. As a result, the degree of reality achieved by the conventional texture mapping techniques is not enough in such a situation.

To increase the degree of reality achieved by texture mapping, it is important to use directly the data that has been collected by either shooting or measuring the actual object, which is one of the major features of the image based technology. According to the conventional technologies, however, the luminance value of a texture image to be used as an actual shot is fixed and no deformed object is supposed to be used. As a result, a specular reflecting surface of an object, which directly reflects the light that has come from a light source, may have an unnatural texture. Or an unreal texture that should be hidden and invisible to the viewer's eye due to a deformation of the object may still be attached. Or an unnatural texture, which is quite different from the actual one, may even be generated. In those cases, the degree of realistic representation will decline steeply, which is a problem.

It is therefore an object of the present invention to realize highly realistic texture mapping even if the object, to which a texture is going to be attached, has been deformed.

Solution to Problem

An image generating system according to the present invention determines the luminance value of a polygon of an object by reference to a texture image. The system includes: a capturing section for storing data about a texture image representing a subject that has been deformed by external force; a memory section for retaining a table of correspondence in which for each of multiple polygons, associated with each other are: position information about a position where one polygon, to which no external force is applied, is located; information about a stress vector indicating external force applied to the position of that polygon; and information about the luminance value of a texture image when the external force is applied; and a texture mapping section for making reference to the table with the position information of the object's polygon, to which no external force is applied, and the information about the stress vector to act on the object's polygon.

The capturing section may further measure the external force, and the texture mapping section may calculate, based on the external force measured, the stress vector to act on the object's polygon and to make reference to the table with.

The capturing section may capture a texture image of the subject that has been deformed by the external force to obtain data about the texture image, and may determine magnitude and starting point of the stress vector indicating the external force applied to the subject, thereby generating information about the stress vector. And the memory section may store the information about the stress vector on the table.

The image generating system may further include: a shape determining section for setting multiple polygons to represent the three-dimensional shape of the object; a stress calculating section for calculating the stress vector to act on each polygon responsive to the external force applied; and a detecting section for determining the luminance value of the texture image, of which the address is closest to that of the stress vector, by the position information about the position of each polygon and the stress vector. The table of the memory section may retain, as an address, the magnitude and starting point of the stress vector and the memory section may output the luminance value of the texture image as the luminance value of the object's polygon.

The capturing section may include a strain sensor and a rangefinder sensor. The strain sensor may determine the magnitude of the stress vector, and the rangefinder sensor may determine the starting point of the stress vector.

While keeping the external force applied to the subject constant, the capturing section may determine the stress vector and may capture the texture image separately.

If either a variation in the magnitude of the stress vector or a shift of the starting point of the stress vector has exceeded a predetermined reference value, the capturing section may capture the texture image.

The strain sensor may be arranged in contact with the subject to measure the external force. The stress calculating section may receive information about the external force measured and may calculate the stress vector to act on each polygon responsive to the external force applied.

The stress calculating section may calculate the stress vector by a model that uses material particles, which have been set on a polygon-by-polygon basis, and spring elasticities connecting those material particles together.

The image generating system may further include a projection transformation section that changes the luminance value of a texture image to be applied to the object's polygon in accordance with the information about the luminance value that has been obtained by making reference and that outputs the texture image.

An image generating method according to the present invention is used in an image generating system for determining the luminance value of an object's polygon by reference to a texture image. The method includes the steps of: obtaining data about a texture image representing a subject that has been deformed by external force; drawing up table of correspondence in which for each of multiple polygons, associated with each other are: position information about a position where one polygon, to which no external force is applied, is located; information about a stress vector indicating external force applied to the position of that polygon; and information about the luminance value of a texture image when the external force is applied; making reference to the table with the position information of the object's polygon, to which no external force is applied, and the information about the stress vector to act on the object's polygon; and changing the luminance value of a texture image to be applied to the object's polygon in accordance with the information about the luminance value that has been obtained by making reference, thereby outputting the texture image.

A computer program according to the present invention is executed by a computer of an image generating system for determining the luminance value of an object's polygon by reference to a texture image. The computer program is defined to make the computer perform the steps of: obtaining data about a texture image representing a subject that has been deformed by external force; drawing up a table of correspondence in which for each of multiple polygons, associated with each other are: position information about a position where one polygon, to which no external force is applied, is located; information about a stress vector indicating external force applied to the position of that polygon; and information about the luminance value of a texture image when the external force is applied; making reference to the table with the position information of the object's polygon, to which no external force is applied, and the information about the stress vector to act on the object's polygon; and changing the luminance value of a texture image to be applied to the object's polygon in accordance with the information about the luminance value that has been obtained by making reference, thereby outputting the texture image.

A storage medium according to the present invention may have stored thereon the computer program of the present invention described above.

Advantageous Effects of Invention

According to the present invention, the luminance value of a texture image is obtained by actually shooting a subject that has been deformed, and therefore, any deformation to be produced by contact of the subject with something else can be represented as a highly realistic moving picture by computer graphics. As a result, video can be represented with increased power of expression.

BRIEF DESCRIPTION OF DRAWINGS

FIG. 4 illustrates how a representative point search section 1106 works.

FIG. 8 illustrates how a material particle spring setting section 1702 works.

FIG. 9 shows an address conversion table 1901.

DESCRIPTION OF EMBODIMENTS

Hereinafter, preferred embodiments of an image generating system according to the present invention will be described with reference to the accompanying drawings. In the first and second preferred embodiments to be described below, the image generating system of the present invention is supposed to be implemented as an image generator that includes multiple components in the same housing. After that, a different kind of image generating system, in which multiple components are connected together over a network, will be described as a third preferred embodiment of the present invention.

Embodiment 1

An Image Generator for Obtaining the Luminance values of a texture image based on coordinates of a polygon, to which a texture is going to be attached, will be described as a first specific preferred embodiment of the present invention. The image generator of this preferred embodiment transforms a three-dimensional coordinate system into a two-dimensional one with which computer graphics are represented, and then refers to a table of correspondence in which two-dimensional coordinates are associated with the luminance values of a texture image. As a result, a luminance value associated with a specific location, to which the texture image is going to be attached, can be obtained.

In the following description, first of all, such an image generator will be described. After that, described is an image generator, which determines luminance values of a texture image representing a deformed object by actually shooting it, measures the stress that has been produced and applied to the object as a result of the deformation, and then obtains the luminance values of the texture image using, as an address, the coordinates of a polygon to which the texture image is going to be attached and the stress.

As used herein, the "polygon" refers to two-dimensional data of a polygon, which is used to represent a solid-state object by three-dimensional computer graphics. The surface of an object is represented by connecting together the respective vertices of the polygon based on coordinate data. The smaller respective polygons, the more smoothly the object can be rendered as a set of those polygons. In that case, however, tons of vertex coordinate data needs to be computed in profusion, thus imposing a lot of processing load on computation and drawing processes.

Figure 1:
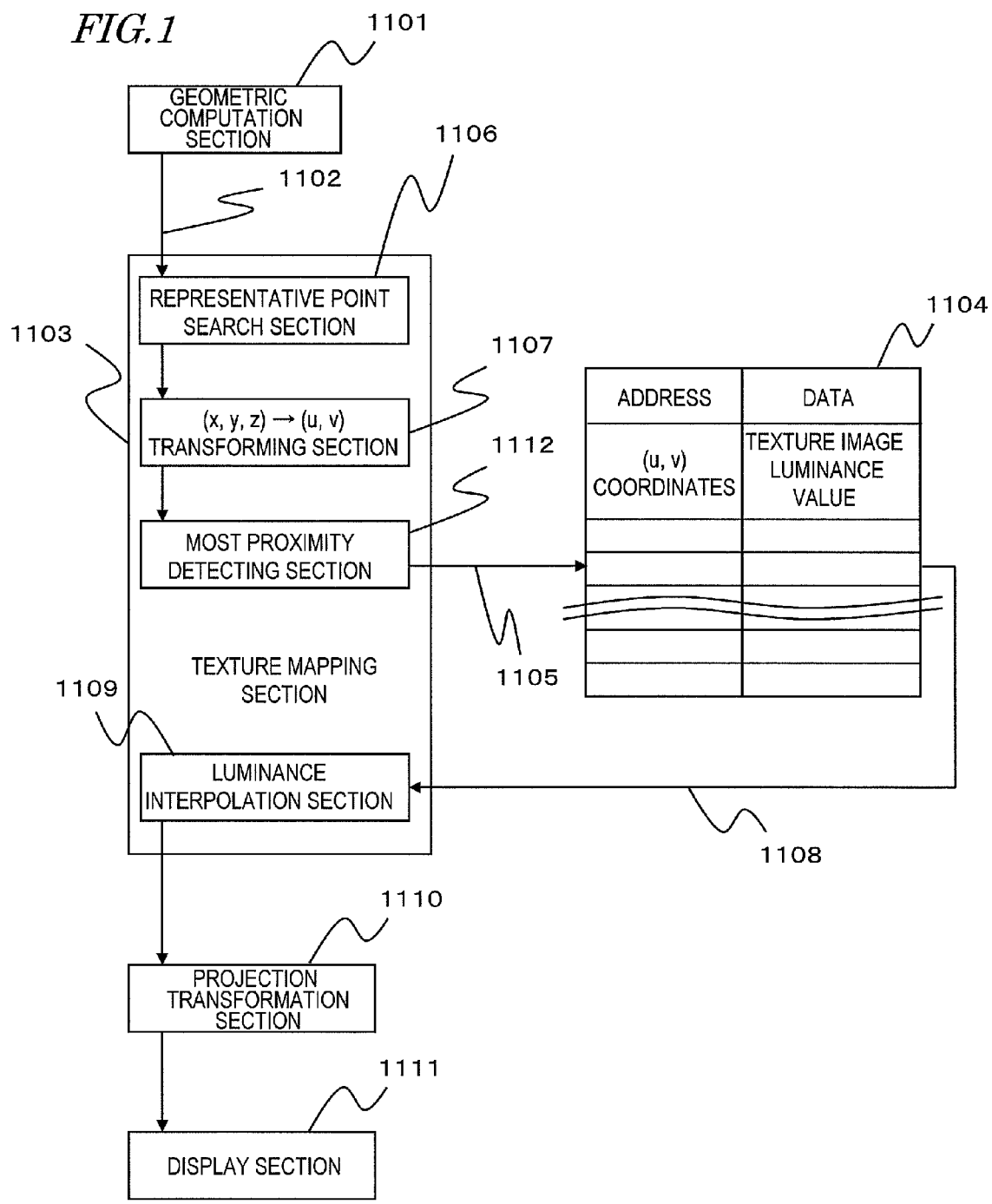
FIG. 1 is a block diagram illustrating a two-dimensional image texture mapping technique.

FIG. 1 is a block diagram illustrating a configuration for the image generator of this preferred embodiment and the flow of data between its components. Specifically, the arrows shown in FIG. 1 indicate a flow in which computer graphs are created mainly by texture mapping. Except its display section 1111 shown in FIG. 1, the image generator may be implemented as either a combination of a processor (which is a computer) with a computer program or a processor dedicated to texture mapping process.

Figure 2:
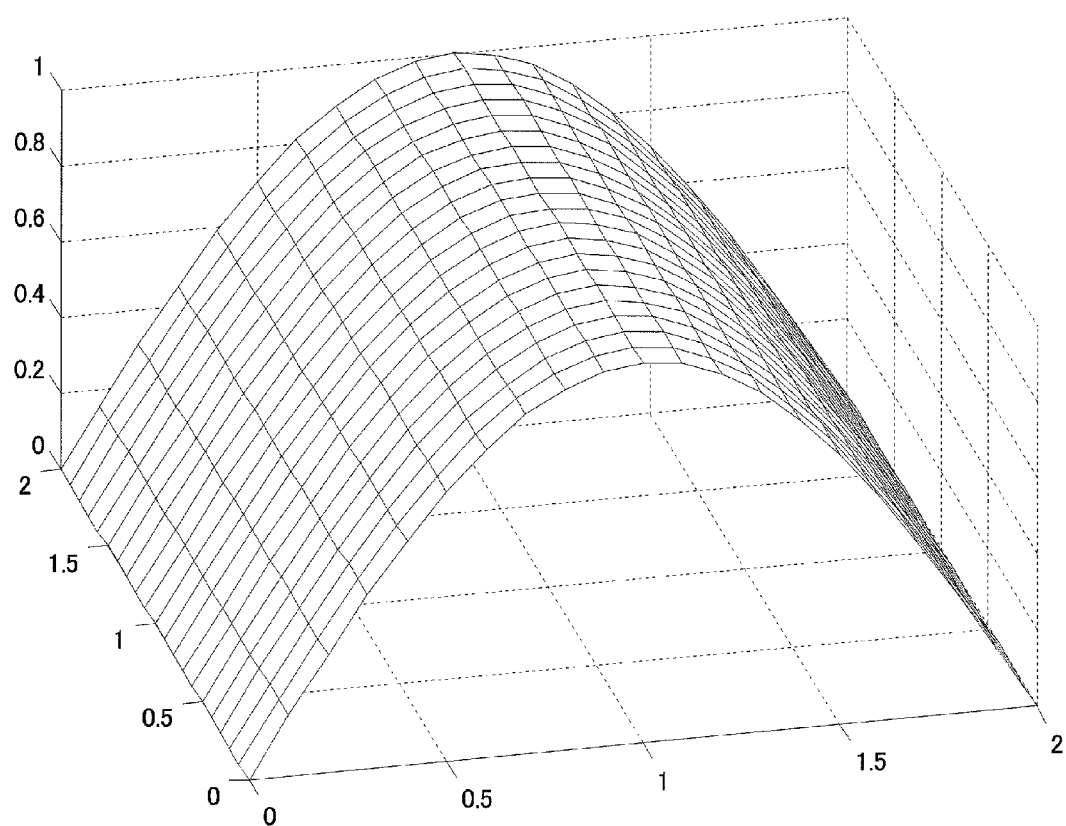
FIG. 2 illustrates what polygons are.

The image generator includes a geometric computation section 110, which defines the position and shape of an object three-dimensionally and outputs a three-dimensional shape signal 1102. Normally, the shape of an object is described by dividing the object into a huge number of polygons. FIG. 2 illustrates an example in which a mountain shape is divided into a number of rectangular polygons. Each of those polygons is a rectangle consisting of a plurality of lines. However, the smaller the size of each polygon, the more smoothly a curve can be represented. Thus, the three-dimensional shape signal 1102 is made up of (x, y, z) coordinates of a lot of polygons. In this description, the polygons are supposed to be rectangular. However, this is only an example. Alternatively, the polygons may have other appropriate polygonal shape, e.g., a triangular shape.

Figure 3:
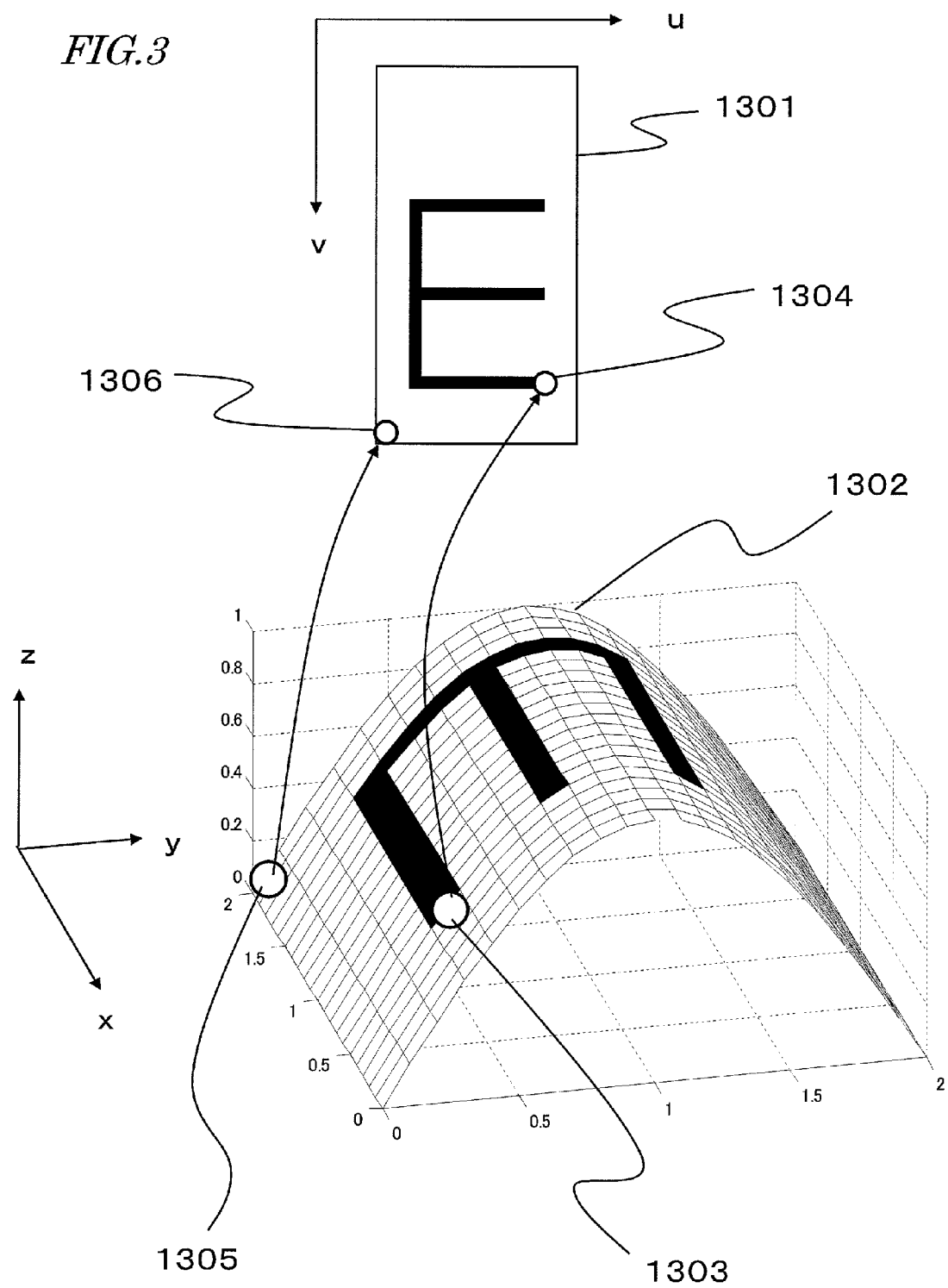
FIG. 3 illustrates a correspondence between the (x, y, z) coordinates of polygons and the (u, v) coordinates of texture image luminance values in texture mapping.

Next, a texture mapping section 1103 calculates the luminance values of the polygons by reference to the luminance value of the texture image that is stored in a luminance value memory section 1104. As shown in FIG. 3, the (x, y, z) coordinates of the polygons that have been obtained as the three-dimensional shape signal 1102 are transformed into (u, v) coordinates representing the luminance value of the texture image. In the example illustrated in FIG. 3, the texture image is supposed to be the letter E to increase the clarity of description. The luminance value 1301 of the texture image is attached to the mountainous object 1302 by texture mapping. For example, the (x, y, z) coordinates of a point 1303 on the letter E mapped correspond to the (u, v) coordinates of a point 1304 on the texture image. Thus, the luminance value of the polygon representing the point 1303 is determined to be zero representing the color black. On the other hand, the (x, y, z) coordinates of another point 1305 on the background correspond to the (u, v) coordinates of a point 1306 on the texture image. Thus, the luminance value of the polygon representing the point 1305 is determined to be one representing the color white.

It is not impossible for the designer to define the correspondence between the (x, y, z) coordinates of each polygon and the (u, v) coordinates of its associated luminance value of the texture image for every possible combination during the design process. Nevertheless, since a huge number of pixels should be processed to create a highly realistic image or video, actually it is not a practical measure to take for the designer to define that correspondence one by one. For that reason, normally, a typical correspondence, designated by the designer, is entered into a computer, which carries out interpolation and other kinds of computational processing on each and every pixel in accordance with the instruction. For instance, in the example shown in FIG. 4, the points 1304, 1306 and 1401 on the luminance value 1301 of the texture image and the points 1305, 1402 and 1403 on the object shape are representative points that designate the correspondence between the (x, y, z) coordinates of the polygons and the (u, v) coordinates of the texture image. The luminance value of another polygon that is not located at any of the designated positions (e.g., the luminance value of a polygon 1404) is calculated by making interpolation based on the correspondence between the (x, y, z) coordinates of the polygons at the neighboring points 1305, 1402 and 1403 and the (u, v) coordinates of the luminance value of the texture image. Specifically, the luminance value L of the polygon 1404 can be obtained by linear interpolation by adding, as weights, the respective inverse numbers of the distances D1, D2 and D3 from the polygon 1404 to the points 1305, 1402 and 1403 as represented by the following Equations (1):

$$L = \sum_{i=1}^{3} w_i L_i \quad (1)$$

$$w_i = \sum_{j=1}^{3} \frac{\frac{1}{D_i}}{\frac{1}{D_j}}$$

where Li represents the luminance values at the points 1304, 1306 and 1401 on the texture image.

Thus, in order to get polygon luminance values that should be used to make interpolations, the texture mapping section 1103 sends a polygon coordinate signal 1105 to the luminance value memory section 1104. In the example illustrated in FIG. 4, the target of texture mapping is the polygon located at the point 1404. To determine the luminance value of this point 1404, the luminance values of the representative points 1305, 1402 and 1403, at which the correspondence between the (x, y, z) coordinates of the polygons and the (u, v) coordinates of the luminance value of the texture image is already known, are retrieved from the luminance value memory section 1104.

A representative point search section 1106 searches for representative points in the vicinity of the target point 1404 of texture mapping to find and output the points 1305, 1402 and 1403. An (x, y, z)→(u, v) transforming section 1107 has been given the correspondence between the (x, y, z) coordinates of the polygon specified by a computer graphics designer and the (u, v) coordinates of the luminance value of the texture image and transforms the coordinates of the points 1305, 1402 and 1403 into their associated (u, v) coordinates in accordance with the correspondence. A most proximity detecting section 1112 detects (u, v) coordinates that are closest to those of the representative points from the luminance value memory section 1104 and outputs them as the polygon coordinate signal 1105. Using the (u, v) coordinates received as the polygon coordinate signal 1105 as data addresses, the luminance value memory section 1104 obtains the luminance values of the texture image and sends them back as a texture luminance signal 1108 to the texture mapping section 1103. And a luminance interpolation section 1109 calculates the luminance value of the polygon at the point 1404 by Equations (1).

A projection transformation section 1110 transforms a given three-dimensional shape into a two-dimensional projection plane, thereby generating a two-dimensional image on the display section. As disclosed in Non-Patent Document No. 1, the projection transformation can be carried out by any of a number of techniques including a perspective projection method that gives the viewer a feeling of depth.

An LCD may be used as a display section 1111 to present a two-dimensional computer graphics image on its LCD monitor.

By attaching an actual shot to the shape as described above, a highly realistic texture can be generated.

However, the gloss and shade of an actual shot are obtained from a real thing with a two-dimensional shape and different from those of another real thing with a three-dimensional stereoscopic shape. For instance, a specular reflector subject reflects specularly the light that has come from a light source, and therefore, has a shade with locally high intensity values, which is a factor that determines its gloss and other looks. In the example described above, since the luminance value of the texture image 1003, which has been obtained by attaching the two-dimensional texture image 1002 to a cylindrical shape, maintains the gloss and shade of the original two-dimensional image, which are different from those of a three-dimensional shape.

Figure 5:
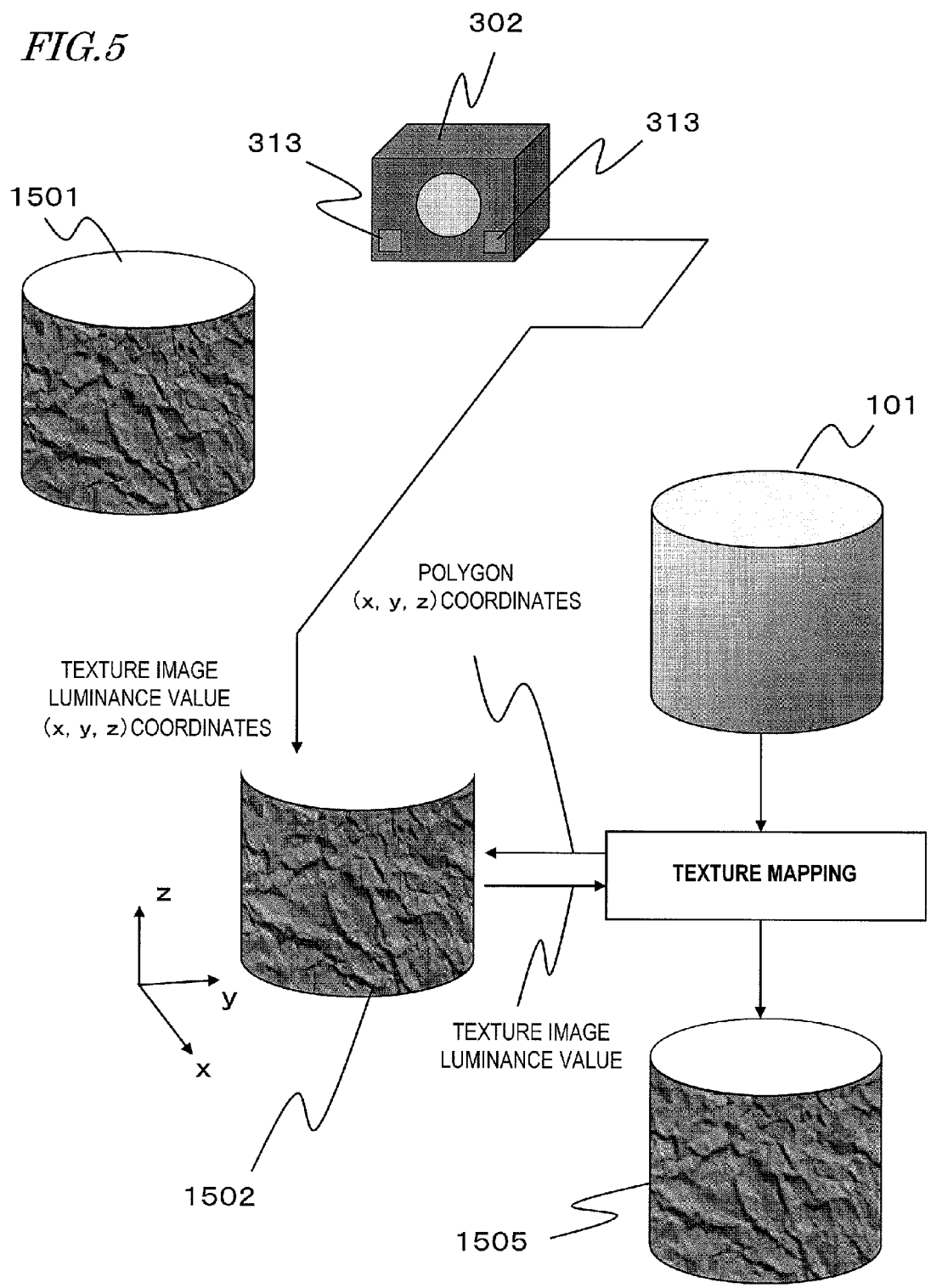
FIG. 5 illustrates how to carry out texture mapping using three-dimensional coordinates (x, y, z).

Thus, to match the gloss and looks of the luminance value of a texture image to those of a real thing, the luminance value of the texture image is obtained along with its three-dimensional coordinates. That is to say, as shown in FIG. 5, a three-dimensional subject 1501 is shot with a camera 302, thereby obtaining the luminance value of a texture image. Meanwhile, the distance to the subject 1501 is also measured with a rangefinder sensor 313, thereby obtaining the (x, y, z) coordinates of each pixel of the luminance value of the texture image. As a result, the luminance value 1502 of the texture image has (x, y, z) coordinates and a luminance value, which indicate a luminance value at a measuring point with (x, y, z) coordinates on the subject 1501, for each pixel thereof. The texture mapping is carried out by detecting the (x, y, z) coordinates of the luminance value of the texture image 1502 that are closest to those of a polygon on the cylinder 1001 and by attaching the luminance value of that texture image to a rendered image 1505.

An exemplary scheme for performing the processing described above is shown in FIG. 6, which is a block diagram illustrating a configuration for an image generator that obtains the luminance value of a texture image based on the coordinates of a polygon and showing the flow of data between its components. The image generator performs texture mapping in order to obtain the luminance value of a texture image using the (x, y, z) coordinates of a polygon as already described with reference to FIG. 5. In a luminance value memory section 1601, stored are the (x, y, z) coordinates and luminance values that have been obtained in advance at measuring points on the subject 1501. A most proximity detecting section 1602 detects a measuring point, of which the coordinates are closest to the (x, y, z) coordinates of a polygon that have been provided as a three-dimensional shape signal 1102, and specifies the address of that measuring point by sending a polygon coordinates signal 1105 to the luminance value memory section 1601.

As a result, there is no need to define the correspondence between the (x, y, z) coordinates of each polygon and the (u, v) coordinates of its associated luminance value of a texture image, although that has to be done according to the method of mapping the luminance value of a two-dimensional texture image as shown in FIG. 1. Specifically, the representative point search section 1106 and (x, y, z)→(u, v) transforming section 1106 shown in FIG. 1 are no longer necessary. Instead, the most proximity detecting section 1602 accesses the luminance value memory section 1601. In addition, since the texture image luminance value itself that has been obtained from the luminance value memory section 1601 is mapped, the luminance interpolation section 1109 is no longer necessary, either.

Figure 6:
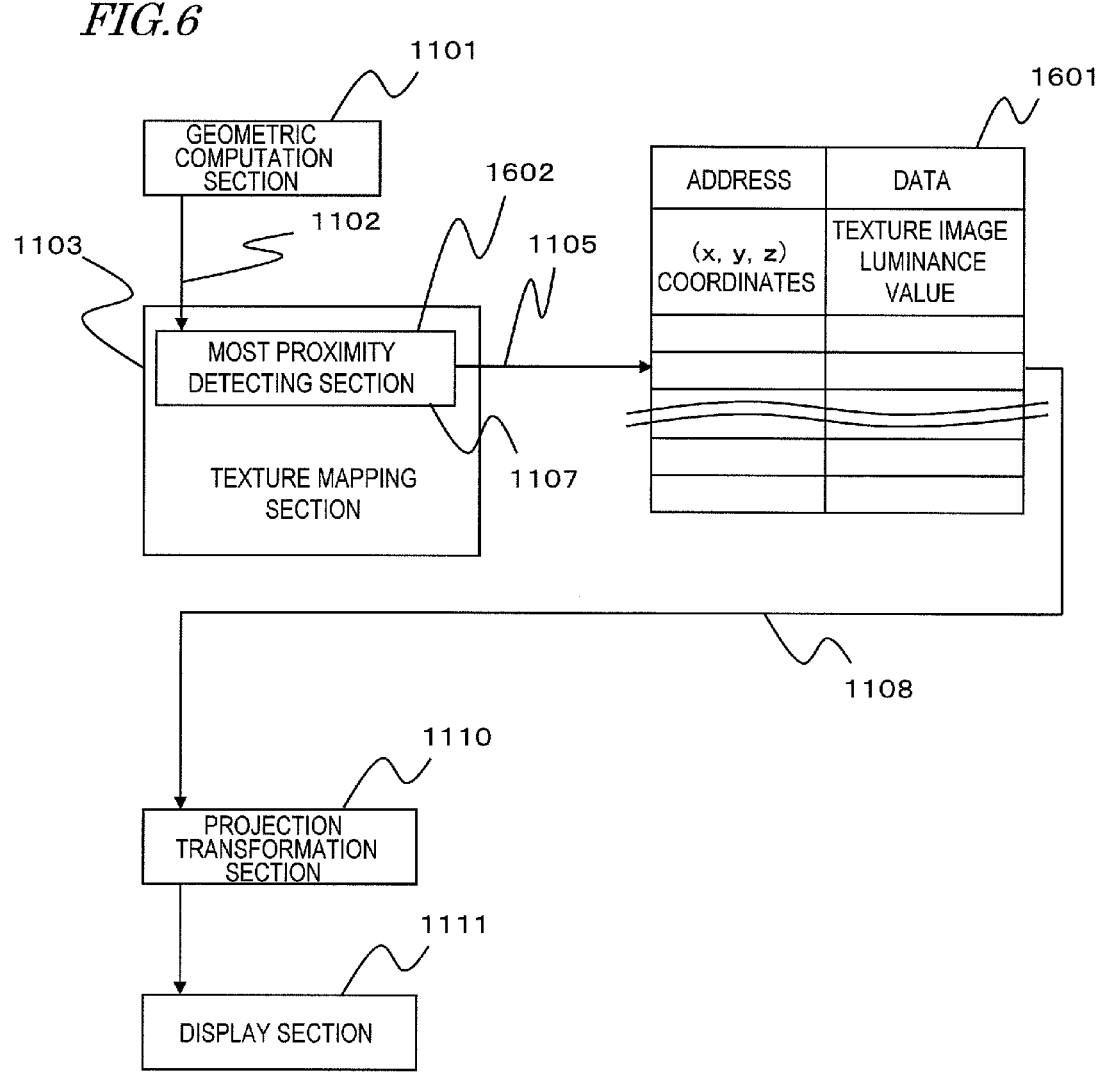
FIG. 6 is a block diagram illustrating how to carry out texture mapping by obtaining texture image luminance values as three-dimensional coordinates (x, y, z).

Consequently, according to the scheme shown in FIG. 6, not only the luminance value of a texture image but also the (x, y, z) coordinates of a measuring point, where the luminance value of the texture image has been determined, are obtained from the real thing as an actual shot. That is why there is no need to define the correspondence between the (x, y, z) coordinates of a polygon and the (u, v) coordinates of the luminance value of a texture image.

In the processing described above, the luminance value of a texture image is supposed to be changed with respect to a still subject.

In movies, ads, newscasts and various other kinds of media, computer graphics are often used to make a moving picture consisting of multiple frame pictures. If the movement of an object or a viewpoint is represented with a moving picture, the power of expression and the understandability of description can be increased effectively. When something is represented with a moving picture in this manner, some deformation of an object, which is caused by contact between two things, is a rendering factor that is often required in a lot of scenes and that contributes immensely to increasing the degree of reality of computer graphics. That is why it should be very beneficial if the texture mapping technique described above could be applied to representing a deformation of an object. For that purpose, the geometric computation section 1101 (see FIGS. 1 and 6) should have the function of making computations that are related to some deformation of an object.

In view of these considerations, it will be described how to carry out texture mapping on an object that undergoes deformation.

Figure 7:
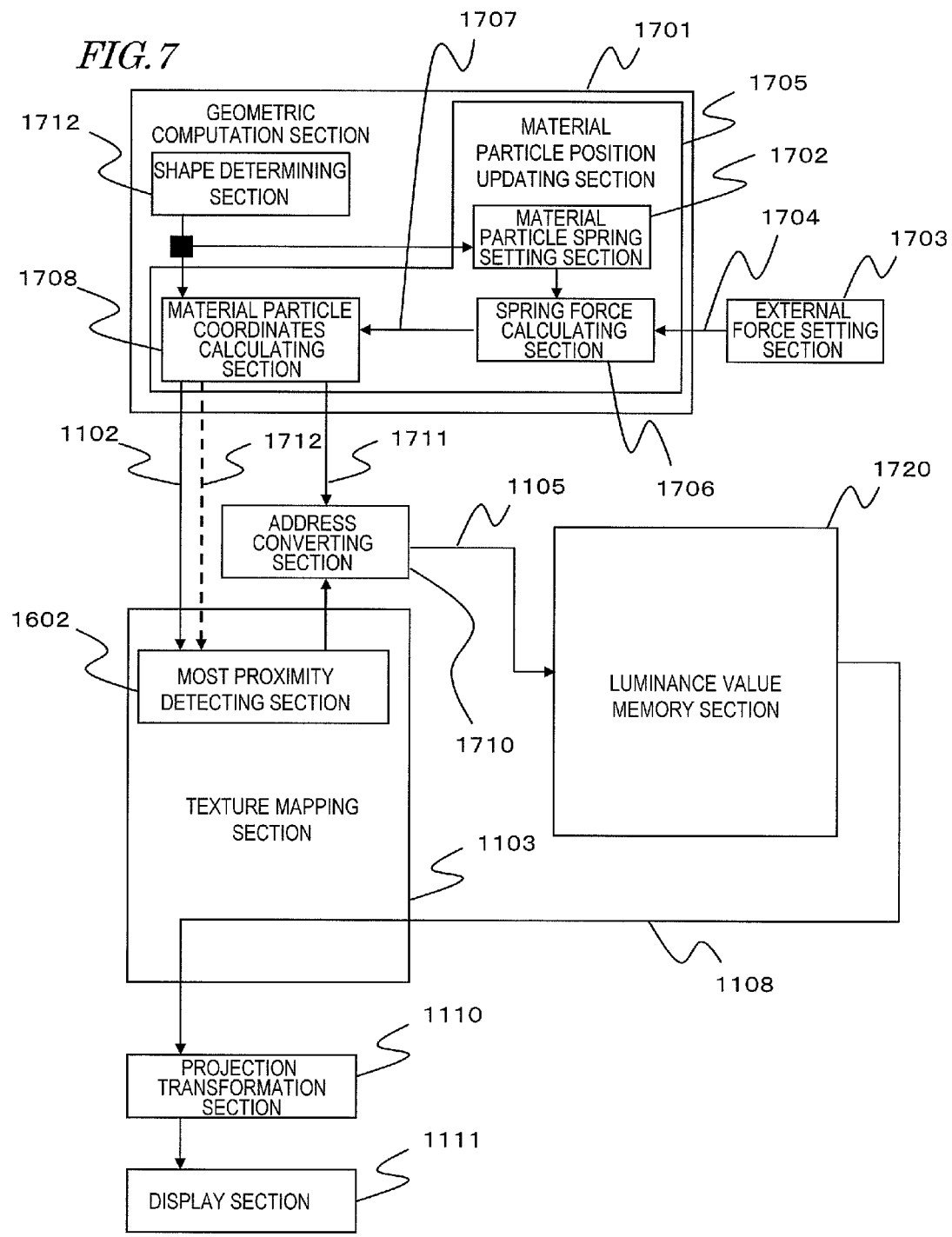
FIG. 7 is a block diagram illustrating how to perform texture mapping even on an object being deformed by external force.

FIG. 7 is a block diagram illustrating an image generator, which is designed so as to be able to perform texture mapping even on an object being deformed by external force. In this case, the geometric computation section 1701 not only describes a given shape as a combination of polygons as shown in FIG. 2 but also has material particles 1801 and springs 1802 as shown in FIG. 8.

According to "Accuracy Verification of Dynamic Cloth Simulation by Comparison with Real Cloth Behavior in Vacuum" (Kazuyoshi TAGAWA, Hirotaku HAYASHI, Ryugo KIJIMA and Tekeo OJIKA, Proceedings of the Virtual Reality Society of Japan Annual Conference 7, pp. 361-364, 2002), the elasticity of an object is distributed as discrete spring elasticities and tensile force and bending force responding to external force are set, thereby describing the elasticity of the object. Material points representing a weight property are usually set at the vertices of a polygon, and therefore, springs are arranged along the sides of the polygon that connect its vertices together.

In the document cited above, the object is supposed to be a piece of cloth. However, as disclosed in "Development of Medical Training System Using Haptic Texture" (Nobuhiko TAMURA, Norimichi TSUMURA, Yoichi MIYAKE, Masahiro TANABE and Akira YAMAMOTO, VR Medicine, Vol. 3, No. 1, pp. 30-37, 2004), for example, this method is also applicable to skin, organs and various other objects with elasticity. The tensile force Fstretch and the bending force Fbend can be represented by the following Equations (2) and (3), respectively. Forces applied to all springs are obtained, the resultant force of the forces acting on the respective material particles is calculated, and then the coordinates xi of a material particle i are obtained by the following Equation (4):

$$F_{stretch} = T\left(\frac{l-l_0}{l_0}\right)L_{ij} \quad (2)$$

$$F_{bend} = B(K)N_i \quad (3)$$

$$x_i^{n+1} = x_i^n + v_i^{n+1}dt \quad (4)$$

$$v_i^{n+1} = v_i^n + F_i^n\frac{dt}{m_i}$$

In Equation (2), T( ) represents a stretch ratio-tensile force function, l represents the length of a spring at the time of calculation, l0 represents the initial length of the spring, and the vector Lij is a unit direction vector pointing from a material particle Pi toward another material particle Pj. In Equation (3), B( ) represents a curvature-moment function, K represents a curvature, and the vector Ni is a unit normal vector that is perpendicular to the line that connects the material particles Pi and Pj together. In Equation (4), mi represents the mass of the material particle i, the vector vi is a velocity vector of the material particle i, the vector Fi is a force vector of the material particle i the vector Fi is a force vector of the material particle i, n represents the current time, and n+1 represents the next time.

According to this model, a shape variation can be represented in a generalized form. That is to say, if an object has been deformed by external force, its shape variation can be described as movements of material particles. Once such a shape variation has occurred, the addresses (which are represented by coordinate values) in the luminance value memory to access are changed into a different one, from which the luminance value is retrieved. By changing the addresses represented by coordinate values in this manner, texture mapping can be carried out using an appropriate luminance value.

The geometric computation section 1701 calculates a new set of coordinates of a material particle that have changed as a result of deformation. Specifically, in the geometric computation section 1701, a shape determining section 1712 determines the shape of the object deformed, and a material particle spring setting section 1702 sets the position and mass of a material particle and the structure and elasticity of a spring. The geometric computation section 1701 also receives an external force vector 1704 from an external force setting section 1703. And a material particle position updating section 1705 calculates the new set of coordinates of the material particle moved by Equations (2) to (4).

In the material particle position updating section 1705, a spring force calculating section 1706 calculates the force Fi acting on the spring as a spring force vector 1707 by Equation (2) or (3). Thereafter, a material particle coordinates calculating section 1708 transforms the force vector Fi into material particle position information xi by Equation (4). That is to say, the cause of the object's deformation is given as a force (i.e., the external force vector 1704). Then, the material particle coordinates calculating section 1708 replaces the spring force vector 1707 of a dynamical system with a three-dimensional shape signal 1102 of a geometric system, thereby describing the shape deformation of the object as a movement of the material particle.

From the point of view of the material particle position updating section 1705, the luminance value of the measuring point's (x, y, z) coordinates, which is stored in the luminance value memory section 1720, is associated with the current time n, not the next time n+1. That is why the description of the object's deformation that is made by the material particle coordinates calculating section 1708 based on the movement of the material particle needs to be made by the luminance value memory section 1720, too. Specifically, for that purpose, the addresses in the luminance value memory section 1720 to access are changed responsive to the movement of the material particle.

Thus, the address converting section 1710 changes the addresses in the luminance value memory section 1720 responsive to the object's deformation. On sensing that a material particle has moved (i.e., on finding the coordinates (xi, n+1) different from the coordinates (xi, n)), the material particle coordinates calculating section 1708 sends information about the material particle's movement as a material particle movement signal 1711 to the address converting section 1710. In response, the address converting section 1710 draws up an address conversion table so that the (x, y, z) coordinates of the current time n makes reference to the (x, y, z) coordinates of the next time n+1. FIG. 9 shows an example of the address conversion table 1901, in which data 1902 indicates that the material particle is located at (x, y, z)=(20, 100, 90) at the current time n but will move to (x, y, z)=(20, 100, 75) at the next time n+1.

If a most proximity detecting section 1602 can detect the most proximity of (x, y, z)=(20, 100, 90) that is received as the three-dimensional shape signal 1102 at the current time n, an appropriate texture image luminance value can be obtained. However, if the same location where (x, y, z)=(20, 100, 90) in the luminance value memory section 1720 is still referred to even at the next time n+1, the texture image luminance value obtained will be 25 pixel away from the correct one in the z direction.

That is why at the next time n+1, the most proximity detecting section 1602 makes reference to the address conversion table 1901 for (x, y, z)=(20, 100, 75). As a result, the data 1902 is selected and the texture image luminance value of the measuring point that has been located at (x, y, z)=(20, 100, 90) at the current time n can be obtained.

In the address conversion table 1901, the (x, y, z) coordinates need to be updated not just at the next time n+1 but also at the times n+2, n+3, etc. that follow it as well, whenever the material particle ever moves. Thus, on the next time n+1 column 1903 in the address conversion table 1901, the (x, y, z) coordinates will be overwritten and updated, every time the material particle moves from the next time n+1 on.

As for the current time n column 1904, on the other hand, the (x, y, z) coordinates are never rewritten in order to maintain a fixed relation with the luminance value memory section 1601. Thus, even if the time goes by from n to n+1, n+2, and so on, the material particle coordinates calculating section 1708 has to retain the same (x, y, z) coordinates at the time n.

As indicated by Equation (4), the material particle coordinates calculating section 1708 describes a variation between two consecutive points in time and saves no information about the past. For that reason, information about the measuring point at the time n when the luminance value memory section 1720 was created needs to be stored in the material particle coordinates calculating section 1708. For example, if texture mapping is to be carried out at a time n+10, then the next time n+1 column 1903 records the (x, y, z) coordinates of the material particle at the latest time, as long as the material particle ever moves in the interval between the time n and the time n+10.

Figure 10:
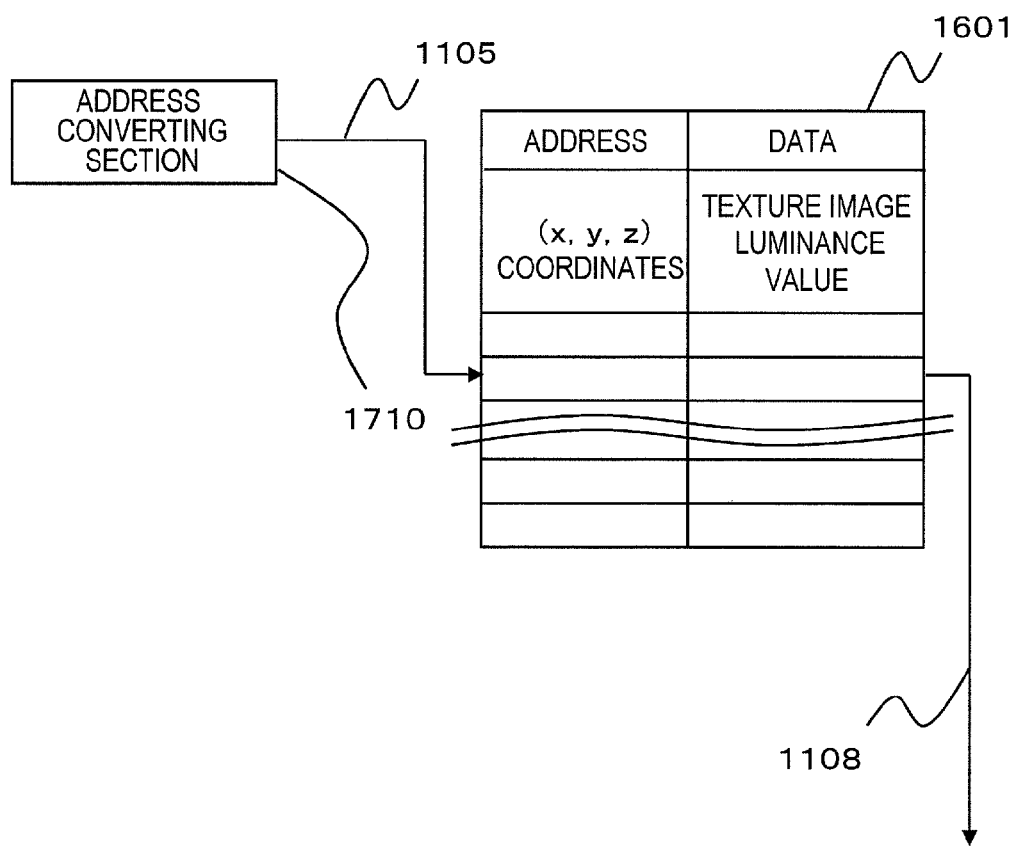
FIG. 10 shows an exemplary texture mapping processing step.

It should be noted that until the address conversion table 1901 gets updated completely, the texture mapping processing needs to be temporarily suspended. That is why on sensing that a material particle has moved, the material particle coordinates calculating section 1708 activates a material particle movement sensing signal 1712 to suspend most proximity detecting section 1602 temporarily. When the material particle coordinates calculating section 1708 finishes checking every material particle, update of the address conversion table 1901 gets done. Then, the material particle movement sensing signal 1712 is deactivated to stop suspending the most proximity detecting section 1602 and resume the texture mapping processing. As shown in FIG. 10, the address conversion section 1710 makes reference to the luminance value memory section 1601 using the polygon coordinate signal 1105 as an address, thereby obtaining the luminance value of the texture image.

As described above, even if the object has been deformed by external force, texture mapping can still be carried out successfully by describing a shape variation as a material particle movement and by changing the addresses in the texture image luminance value memory to access.

In the example described above, every time a material particle moves, the address conversion table is updated to obtain an appropriate texture image luminance value. However, since there is a close correlation between the movement of a material and the magnitude of the stress caused, a stress vector may be used without performing the coordinate transformation described above. In other words, a shape deformation caused by external force does not always have to be described through address conversion representing the movement of a polygon position but may also be described on a stress basis. For example, a soft material changes its coordinates more easily and therefore has greater tensile force and bending force (i.e., causes a greater stress). Conversely, a hard material hardly changes its coordinates and causes a relatively small stress.

Figure 11:
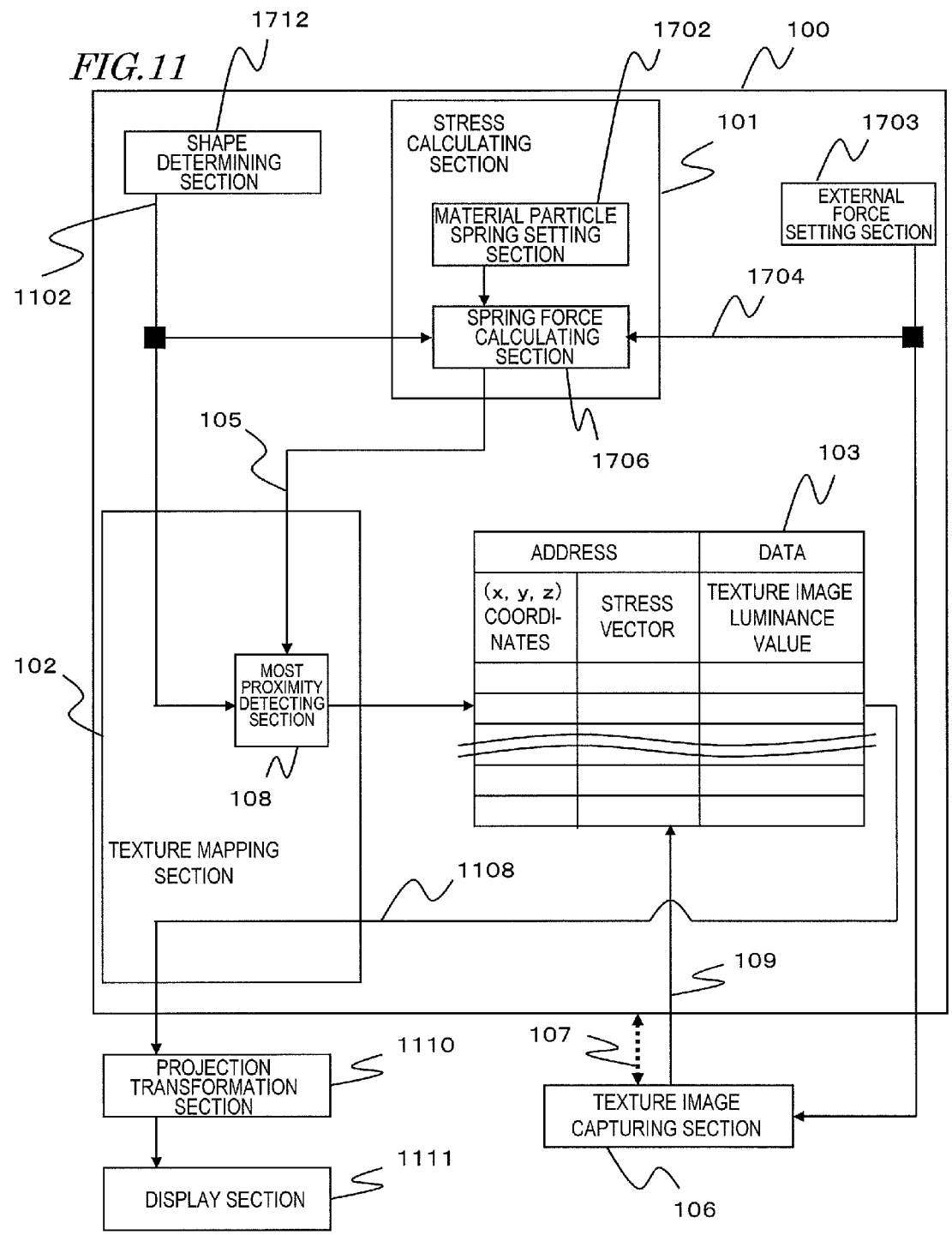
FIG. 11 is a block diagram illustrating a configuration for an image generator 100 as a first specific preferred embodiment of the present invention.

FIG. 11 is a block diagram illustrating an image generator 100 as another preferred embodiment of the present invention.

This image generator 100 includes a shape determining section 1712, a stress calculating section 101, an external force setting section 1703, a texture mapping section 102, and a luminance value memory section 103.

This image generator 100 makes reference to the table that is stored in the luminance value memory section 103 with the object shape, elasticity, external force or any other parameter that has been set by the designer. Specifically, for each of a huge number of polygons, the image generator 100 makes reference to a table in which position information representing the position coordinates (i.e., address) of each polygon, information about the stress vector applied to each polygon position, and information about each texture image luminance value when external force is applied are correlated with each other. The luminance value obtained by making reference to such a table is adopted as a texture image luminance value and a texture image with that luminance value is attached to an object being deformed.

The shape determining section 1712 sets the object shape 1302 shown in FIG. 3 to be a non-deformed shape to which no external force is applied yet. This object shape 1302 is supplied as a three-dimensional shape signal 1102 to the material particle spring setting section 1702.

The stress calculating section 101 includes the material particle spring setting section 1702 and a spring force calculating section 1706 and calculates how much stress has been applied to the polygon that has been received as the three-dimensional shape signal 1102.

The material particle spring setting section 1702 sets material particles at the vertices of each polygon as shown in FIG. 8, thereby setting the property of springs that connect those material particles together. According to this preferred embodiment, the spring property may be set by any arbitrary method. For example, the method of calculating the tensile force Fstretch and the bending force Fbend by Equations (2) or (3) as disclosed in Non-Patent Document No. 2 may be adopted for that purpose.

Based on the settings given by the material particle spring setting section 1702, the spring force calculating section 1706 calculates a force vector Fi by Equation (2) or (3) and then outputs it as a stress signal 105. That is to say, an external force vector 1704 either extends or compresses the spring, thereby changing the spring length l of Equation (2) or the curvature K of Equation (3). As a result, the tensile force Fstretch or the bending force Fbend is generated, and the force vector Fi of Equation (4) is calculated. And this force vector Fi is the stress to be applied to each polygon.

Figure 12:
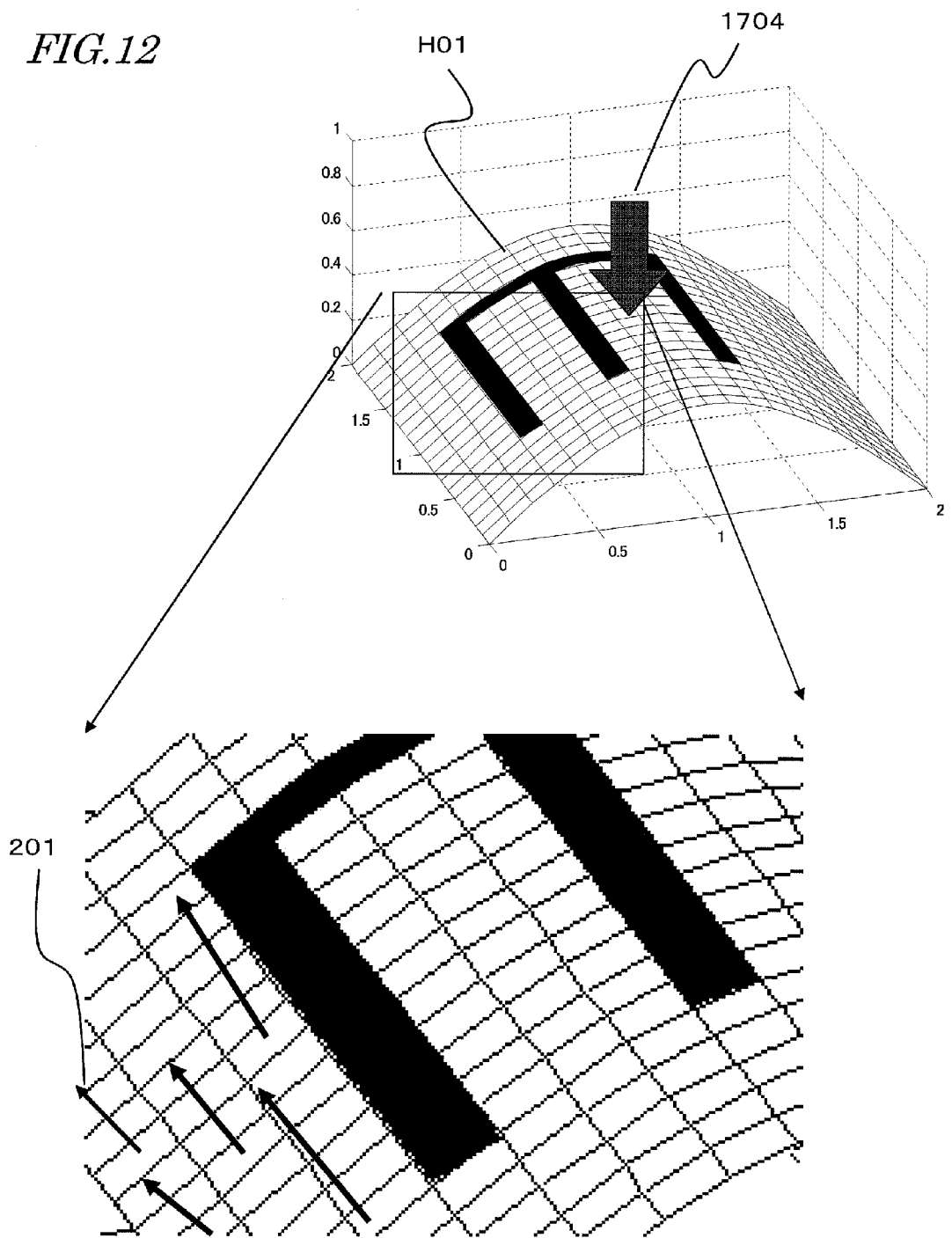
FIG. 12 illustrates a stress vector representing the stress produced by deformation.

The external force setting section 1703 sets the external force vector 1704 that causes the object to be deformed. The object's deformation is designed as a rendering object by the designer of computer graphics. In the example illustrated in FIG. 12, to set the external force vector 1704 means determining the magnitude of the external force vector 1704 and setting a point of effect on the object shape H01.

In this manner, each polygon is given its (x, y, z) coordinates and a stress vector Fi as its attributes.

The luminance value memory section 103 outputs a texture image luminance value, which has been specified by using the (x, y, z) coordinates of the polygon and the stress vector Fi as addresses, in accordance with the instruction given by the texture mapping section 102. As in the prior art, the texture image luminance value is preferably obtained in advance by actual shooting.

In the foregoing description of preferred embodiments of the present invention, it has been described exactly what kind of processing should be performed to represent, by computer graphics, the object that is actually present in front of the designer. That is why it is possible to obtain in advance the texture and luminance value of that actually present object. Hereinafter, a specific configuration for obtaining the texture and luminance value of an object will be described.

Figure 13:
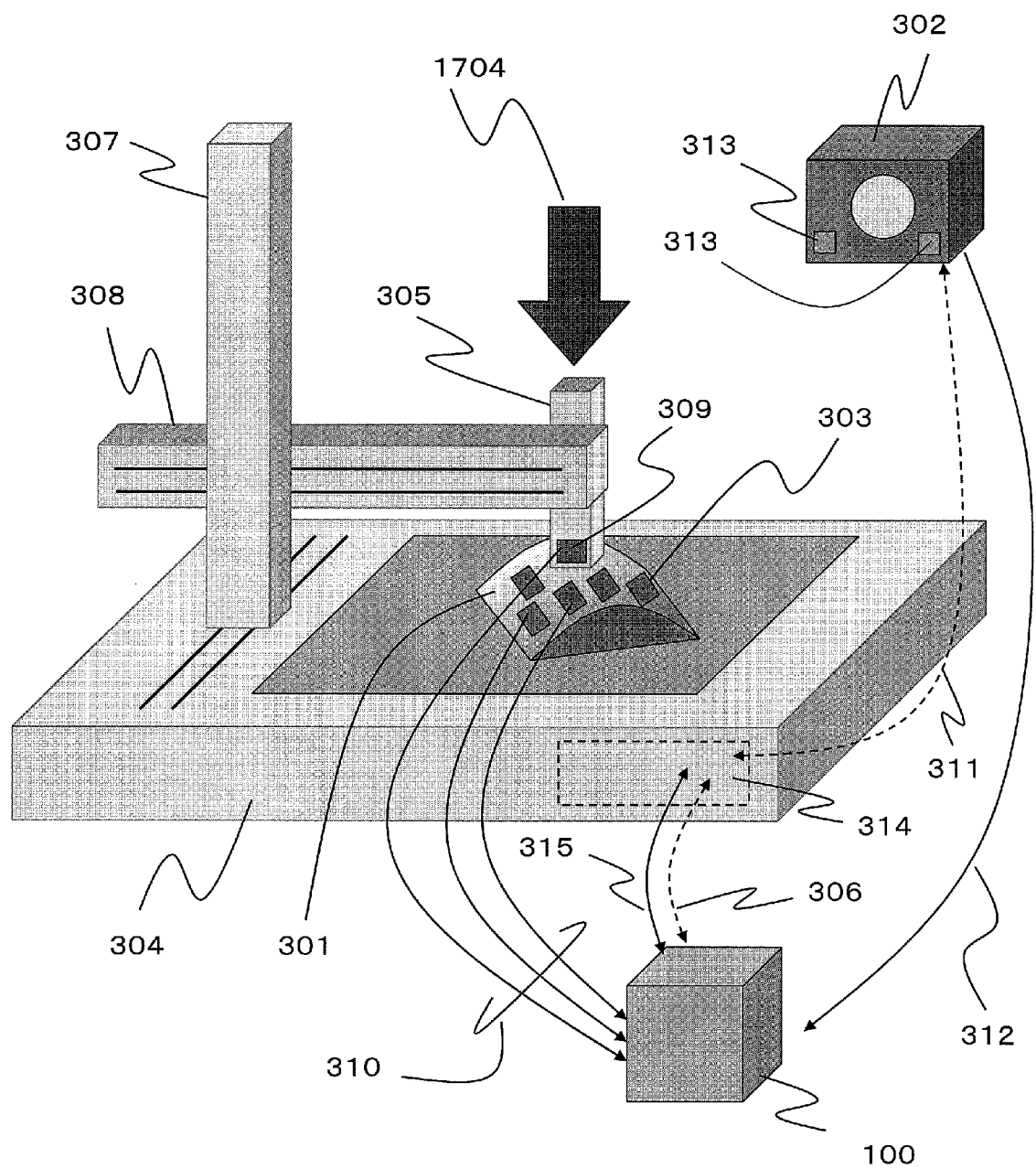
FIG. 13 illustrates how the luminance value of a texture image may be obtained.

FIG. 13 illustrates an exemplary configuration for a texture image capturing section 106 (see FIG. 11), which can not only capture the texture image of a subject that is the object of shooting but also obtain the luminance value of that texture image as well. The texture image capturing section 106 includes a luminance value acquisition control section 314, which controls the overall operation of this texture image capturing section 106 (specifically, the operations of an XYZ stage 304, a camera 302 and a rangefinder sensor 313) and communicates with the image generator 100 over a telecommunications line 306, too. The telecommunications line 306 shown in FIG. 13 is identified by the reference numeral 107 in the block diagram shown in FIG. 11.

The subject 301 is the object of shooting, of which the texture needs to be obtained. When the subject 301 is put on the XYZ stage 304, the luminance value acquisition control section 314 controls two supporting poles 307 and 308, thereby making a contact 305 deform the subject 301. Then, the camera 302 shoots the subject 301 and obtains the luminance value of the texture image. A number of strain sensors 303, which are put on the surface of the subject 301, measure the stress applied to the subject 301 and determine the magnitude of the stress vector. A rangefinder sensor 313 is built in the camera 302 to measure the distance from the camera 302 to the strain sensors 303.

The contact 305 is instructed how to move by the external force setting section 1703 (see FIG. 11) through a data line 315. The external force setting section 1703 is controlled by the designer of computer graphics. As a result, the contact 305 applies external force to the subject 301 just as specified by the designer.

Nevertheless, it would be safer to think that the spring elasticity of the stress calculating section 101 is slightly different from the actual elasticity of the subject 301, and therefore, an appropriate measure should be taken to cope with that. That is why another strain sensor 309 is attached to the contact 305 in order to measure the external force applied to the subject 301. By controlling the movement of the contact 305 so that the measuring data obtained by the strain sensor 309 agrees with the external force vector that has been set by the external force setting section 1703, the error of the spring elasticity of the stress calculating section 101 can be compensated for.

The measuring data obtained by the strain sensors 303 is loaded into the image generator 100 over stress data lines 310.

On the other hand, the shooting data obtained by the camera 302 and the measuring data obtained by the rangefinder sensor 313 are loaded into the image generator 100 through an image data line 312.

It should be noted that according to this preferred embodiment, the timings to control the contact 305, obtain the luminance value of a texture image that has been shot with the camera 302, and make measurements using the strain sensors 303 and 309 may be set arbitrarily. Optionally, the measuring data obtained by the strain sensors 303 and 309 may always be loaded into the image generator 100. Alternatively, the measuring data may be obtained from the strain sensors 303 and 309 exactly when the luminance value of the texture image shot is obtained. That is to say, in that case, when the shutter of the camera 302 is closed, the analog signal on the stress data line 310 is sampled as discrete values. Still alternatively, when the shutter release button of the camera 302 is pressed by the designer of computer graphics, the camera 302 may send a shutter movement identification signal to the image generator 100 by way of the luminance value acquisition control section 314.

Figure 14:
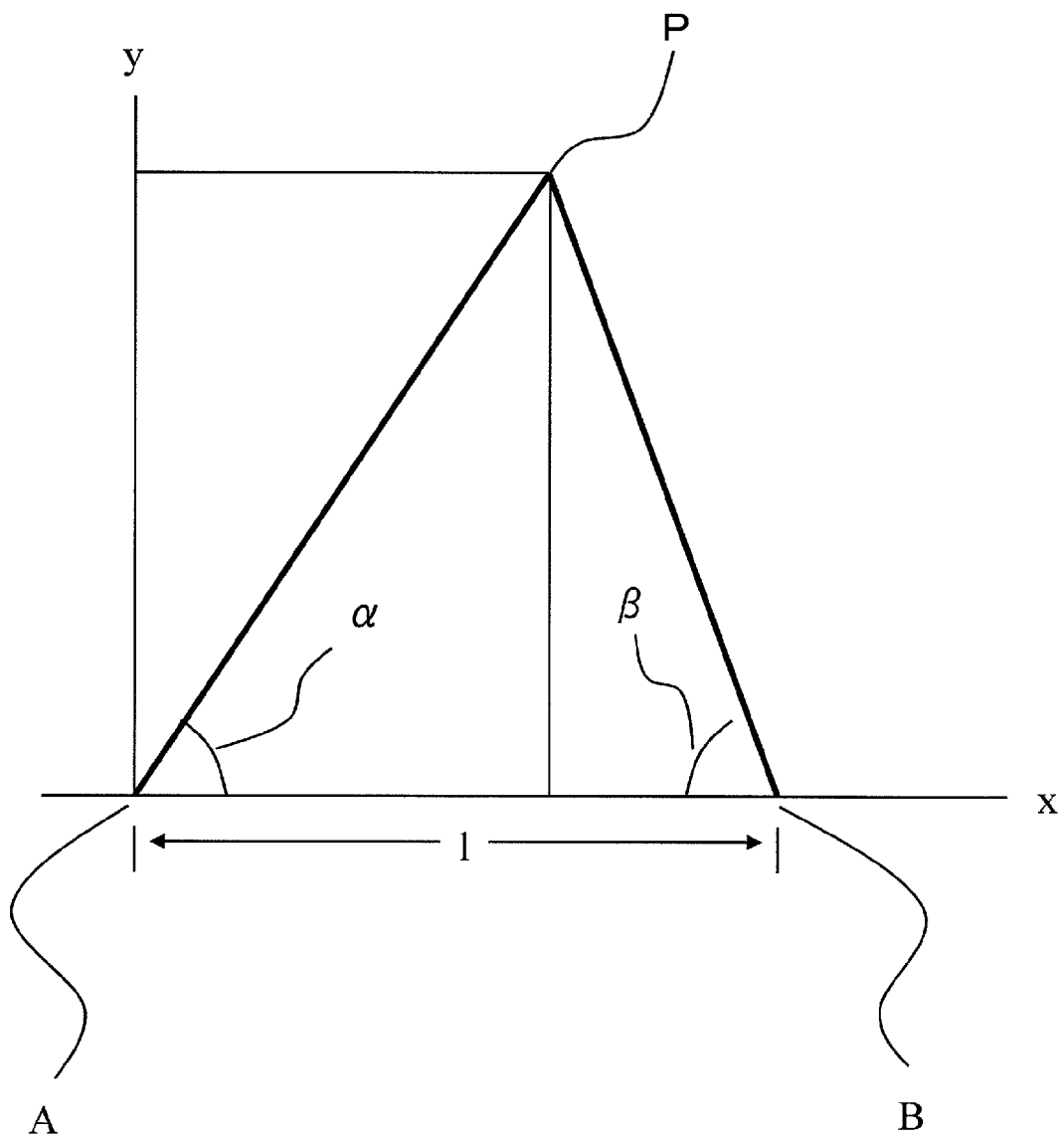
FIG. 14 shows how the distance to a subject may be measured.

The rangefinder sensor 313 is used to determine the three-dimensional position using those strain sensors 303. The position of each of those strain sensors 303 corresponds to the starting point of a stress vector. Although any arbitrary rangefinding method may be used, a triangulation method may be adopted according to this preferred embodiment. FIG. 14 illustrates how to make a triangulation, which is a rangefinding method that is based on the fact that if one side of a triangle and the angles at both ends of that side are given, then that triangle is defined unequivocally. If the angles at which a point P is viewed from two points A and B that are spaced apart from each other by a known distance l are identified by α and β, respectively, the (x, y) coordinates of that point P are given by the following Equations (5):

$$\begin{cases} x = \dfrac{h\tan\beta}{\tan\alpha + \tan\alpha} \\ y = \dfrac{h\tan\alpha\tan\beta}{\tan\alpha + \tan\alpha} \end{cases} \quad (5)$$

Suppose a laser light source is put at the point A, the point P on the object is irradiated with a laser beam, and the laser beam that has been reflected from the point P is captured by a camera that is arranged at the point B, thereby determining the (x, y) coordinates of the point P. In that case, the laser light source at the point A and the camera at the point B may be both included in the camera 302. Or the camera located at the point B may be the image capturing system of the camera 302, too.

In this manner, a stress vector and the three-dimensional (x, y, z) coordinates of the starting point of the stress vector, which are required to specify an address in the luminance value memory section 103, are obtained as measuring data, and the luminance value of a texture image, which is an item of indispensable data, can be obtained as an actual shot. This series of operations are carried out by the texture image capturing section 106. It should be noted that the texture image capturing section 106 does not have to have the configuration shown in FIG. 13 with the XYZ stage 304 but may have a memory (not shown) to store the data of the texture image obtained.

If the direction of a stress vector can be determined, the direction of the stress vector is preferably added to each address in the luminance value memory section 103. This is because if each address in the luminance value memory section 103 consisted of only the magnitude and starting point of a stress vector, the luminance value of the same texture image could be referred to, even when another stress vector, having the same magnitude and starting point as the former, actually has a different direction from it.

Also, as for the portions of the subject 301 to which the strain sensors 303 are attached, the luminance values of the texture image are hidden behind those sensors 303 to the eye of the camera 302. Thus, the camera 302 cannot shoot those portions. As those strain sensors 303 are usually small in size, those hidden luminance values could be replaced with those of surrounding portions that are adjacent to the strain sensors 303. Nevertheless, if the subject is so small that the size of the strain sensors 303 is non-negligible, the camera 302 may obtain the luminance value of the texture image separately from the measurement of the stress by the strain sensors 303. That is to say, this image generator 100 can reproduce the same type of control on the external force vector 1704 a number of times, and therefore, the contact 305 can be controlled to move in the same way over and over again. That is why the subject may be deformed twice in quite the same way (i.e., exactly the same external force may be applied to the subject twice) and the luminance value of the texture image may be obtained at a different time from the stress measurement. In this case, shooting may be done after the stress measurement, or vice versa.

In this manner, every time the subject is deformed by external force, an appropriate luminance value of the texture image can be obtained, thus increasing the degree of reality of a moving picture generated by computer graphics.

Optionally, when the stress needs to be measured, the distribution of the stress may be calculated by some computer model such as a finite element method in order to reduce the number of the strain sensors 303 to attach. This preferred embodiment of the present invention adopts an image-based method, in which the luminance value of a texture image representing a deformed object is obtained from an actual shot, and does not use a computer model to obtain the luminance value of the texture image. Nevertheless, as far as the stress measurement is concerned, the stress could be measured by a computer model, contrary to the preferred embodiment described above. Still alternatively, a combination of stress measurement and stress calculation model or any other arbitrary method may be adopted as well.

Furthermore, in the example illustrated in FIG. 13, control of the respective devices and transmission of data are supposed to be done through cables or lines for convenience sake. However, the present invention is in no way limited to that specific preferred embodiment. Alternatively, wireless telecommunication, storage medium, or any other arbitrary means may be used as well according to the present invention. The luminance value memory section 103 may be implemented as a hard disk or a semiconductor memory that is built in the image generator 100 or may even be a removable portable storage medium such as an optical disc.

Also, although only one strain sensor 309 is attached to the contact 305 in the example illustrated in FIG. 13, this is only an example of the present invention and the number of external force vectors 1704 is never limited according to the present invention. That is to say, multiple external force vector measuring points may be set and multiple external force vectors 1704 may be determined at a certain point in time.

Now take a look at FIG. 11 again. The texture mapping section 102 includes a most proximity detecting section 108 for searching the luminance value memory section 103 for data that is a closest match to the (x, y, z) coordinates the polygon that has been supplied as the three-dimensional shape signal 1102 and data that is a closest match to the stress vector that has been supplied as the stress signal 105. As used herein, if one stress vector is "closest to" another, those two vectors are most proximate to each other. More specifically, if one stress vector is "closest to" another, the former stress vector has a starting point that is nearest to the (x, y, z) coordinates of the polygon and a magnitude that is closest to that of the latter stress vector.

The most proximity detecting section 108 finds (x, y, z) coordinates, which are a closest match to the (x, y, z) coordinates of the polygon that has been supplied as the three-dimensional shape signal 1102, from an address in the luminance value memory section 103. Next, the most proximity detecting section 108 finds a stress vector, which is a closest match to the stress vector that has been supplied as the stress signal 105, in the data with the (x, y, z) coordinates detected from that address in the luminance value memory section 103. By making such a detection in two stages, the luminance value of the texture image can be determined.

According to the preferred embodiment described above, information about the deformation of an object is supposed to be handled by only a dynamical system, not by a geometric system including polygon coordinates. Therefore, the (x, y, z) coordinates of the stress vector's starting point, which indicate an address in the luminance value memory section 103, are used in order to be associated with the polygon coordinates that have been supplied as the three-dimensional shape signal 1102. That is why there is no need to update the (x, y, z) coordinates even if the object undergoes deformation. That is to say, since the (x, y, z) coordinates of the stress vector's starting point, which indicate an address in the luminance value memory section 103, are fixed, there is no need to measure the distance to the strain sensor 303 once the position to which the strain sensor 303 needs to be attached has been determined as the (x, y, z) coordinates. This is the reason why the most proximity detecting section 108 makes such two-stage detection by detecting the most proximity of the (x, y, z) coordinates first and then that of the stress vector.

In detecting the most proximity of the (x, y, z) coordinates, the (x, y, z) coordinates of the stress vector starting point, which are a closest match to the (x, y, z) coordinates of the polygon that have been supplied as the three-dimensional shape signal 1102, are determined first. After that, the data is searched based on the shape at the stress vector starting point located. As a result, a stress vector that is a closest match to the stress signal 105 can be found.

For instance, suppose 100 strain sensors 303 are attached to the subject 301 and the subject 301 is shot 1,000 times in the example illustrated in FIG. 13. In that case, 100,000 (=100× 1,000) texture image luminance values will be stored in the luminance value memory section 103. The most proximity of the (x, y, z) coordinates can be detected by choosing one of those 100 strain sensors 303. Subsequently, the most proximity of the stress vector can be detected by choosing one of those 1,000 stress vectors.

Figure 15:
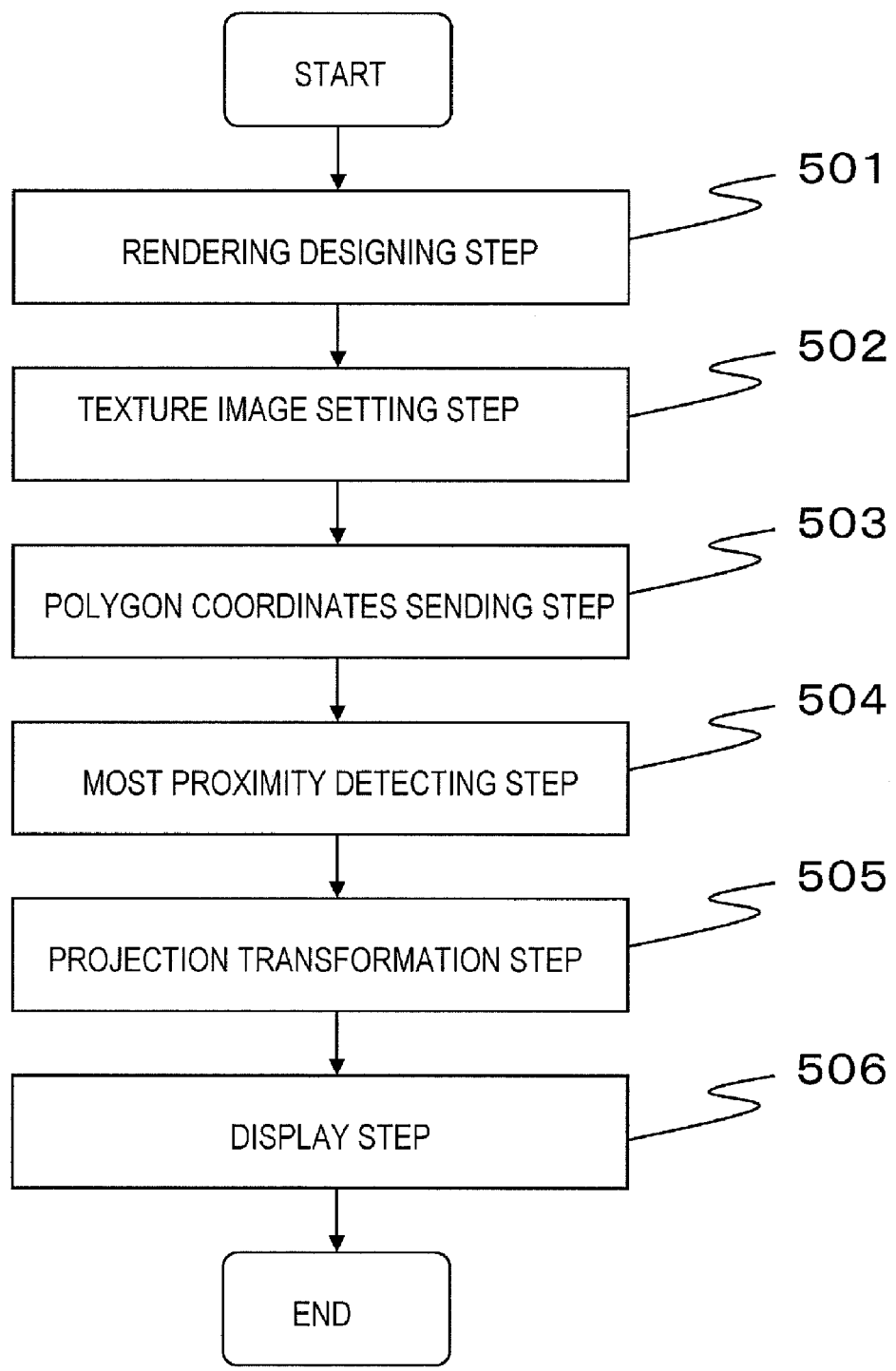
FIG. 15 is a flowchart showing the procedure of processing to get done by the image generator 100.

FIG. 15 is a flowchart showing the procedure of processing to get done by the image generator 100.

First of all, in a rendering designing step 501, the designer sets various parameters of the computer graphics design he or she is going to carry out. First of all, he or she determines the three-dimensional shape of an object to render to be a set of polygons for the shape determining section 1712. In this processing step, that shape is determined to be a non-deformed shape to which no external force has been applied yet. Next, the designer sets the elasticity of the object to render as spring elasticity for the material particle spring setting section 1702. And then he or she sets the external force to be applied to the object to render as an external force vector 1703 for the external force setting section 1703.

The next processing step 502 and the rest of this process are performed mainly by the image generator 100.

In a texture image luminance value setting step 502, the luminance value of a texture image is obtained by actual shooting and a stress vector is determined. In order to obtain the luminance value of the texture image, the designer of computer graphics prepares a subject 301, attaches strain sensors 303 to it, and sets up a camera 302 and a rangefinder sensor 313. In this processing step, the camera 302 is used to obtain the luminance value of the texture image by actual shooting and the strain sensors 303 are used to determine the stress vector. The three-dimensional (x, y, z) coordinates of the strain sensors 303 are determined by the rangefinder sensor 313. Then, using the three-dimensional (x, y, z) coordinates of the strain sensors 303 and the stress vector as an address, the luminance value of the texture image is stored as a data in luminance value memory section 103. This series of operations is performed by the texture image capturing section 106. The subject 301 is deformed by controlling the XYZ stage so that an external force vector 1704 defined by the external force setting section 1703 acts on the subject 301.

Next, in a polygon coordinates sending step 503, the shape setting section 1712 sends the (x, y, z) coordinates of the polygon as a three-dimensional shape signal 1102 to the stress calculating section 101 and the texture mapping section 102.

Then, in a stress calculating step 504, the spring force calculating section 1706 calculates the stress vector acting on the (x, y, z) coordinates of the polygon based on the setting that has been determined by the material particle spring setting section 1702 and on the external force vector 1704 that has been set by the external force setting section 1703.

Thereafter, in a most proximity detecting step 505, the most proximity detecting section 108 of the texture mapping 102 searches the luminance value memory section 103 for an address that is a closest match to the (x, y, z) coordinates of the polygon first, and then determines which of the data with the (x, y, z) coordinates has a stress vector that is a closest match to the stress vector to act on that polygon, thereby outputting the luminance value of the texture image.

Next, in a projection transformation step 506, the projection transformation section 1110 transforms the three-dimensional shape into a two-dimensional one to be projected onto a two-dimensional plane, thereby generating a two-dimensional image to be displayed on the computer screen. More specifically, for that purpose, the projection transformation section 1110 changes the luminance value of the texture image into the one that has been obtained by making reference to the table in the luminance value memory section 103 and then attaches that texture image to each polygon position. Finally, in a display step 507, the display section 1111 displays the two-dimensional image on the computer screen.

By performing these processing steps, the image generator 100 intensifies a shape variation that has been caused by external force into the stress calculating section 101 alone, which is a sort of "dynamical system", and can carry out texture mapping of the object deformed even without transforming the dynamical system into a "geometric system" involving the move of polygon positions. In other words, according to this preferred embodiment, the geometric system has fixed settings and every deformation-induced variation of things is represented solely by the dynamical system.

On the other hand, according to the technique shown in FIG. 7, the texture mapping is carried out by describing, as a dynamical system, the deformation information with the spring force vector 1707 that has been calculated by the spring force calculating section 1706 and then making the material particle coordinates calculating section 1708 transform the dynamical system into a geometric system that involves the move of polygon positions. That is why according to the processing of this preferred embodiment in which every shape variation caused by the external force is represented only by the dynamical system, there is no need to perform the address conversion, which would otherwise be needed to transform a dynamical system into a geometric one, thus simplifying the texture mapping processing significantly. In addition, since texture mapping of an actual shot, which often involves deformation, can get done by reference to the luminance value of the texture image, a highly realistic image can be generated by computer graphics. On top of that, with that high degree of reality maintained, the texture mapping can be carried out much more quickly and the computation circuit can be downsized as well. In other words, the load of the texture mapping processing can be lightened. As a result, the present invention is applicable far more broadly to cellphones and various other mobile electronic devices or even to a network with only a limited operating frequency range.

Nevertheless, it is not impossible to adopt the normal procedure shown in FIG. 3 in which the correspondence between the (x, y, z) coordinates of a polygon and the (u, v) coordinates of the luminance value of a texture image is updated every time the object is deformed. That is to say, instead of understanding a shape variation as a variation in stress as is done in this preferred embodiment or as a shift in the position of a polygon as is done in the prior art, the designer of computer graphics could update the correspondence between the (x, y, z) coordinates of a polygon and the (u, v) coordinates of a texture image by him- or herself every time any deformation arises. However, considering the amount of the work to get done, it is an unrealistic measure to take to manually update the correspondence between the (x, y, z) coordinates of a polygon and the (u, v) coordinates. Among other things, to render an object deformed, it can be said that a moving picture is a must. Consequently, it should be a very natural choice to make to leave it to a computer graphics generating machine, not a man, to sense a change of things that has been caused by deformation by one scheme or another.

Embodiment 2

In the first preferred embodiment of the present invention described above, it has been determined in advance how the shape of an object to render should be changed.

On the other hand, in an image generator according to a second preferred embodiment of the present invention to be described below, in a situation where nobody knows in advance how the shape of an object to render may change, the luminance value of a texture image representing a subject that has been deformed is obtained by actually shooting, and the stress to be applied to the object as a result of the deformation is measured. And based on the results of these measurements, the luminance value of the texture image is obtained using the coordinates of the polygon, to which the texture is going to be attached, and the stress as an address. Specifically, in this preferred embodiment, the external force vector is determined with the object deformed and the measuring data thus obtained is loaded into the external force setting section.

Figure 16:
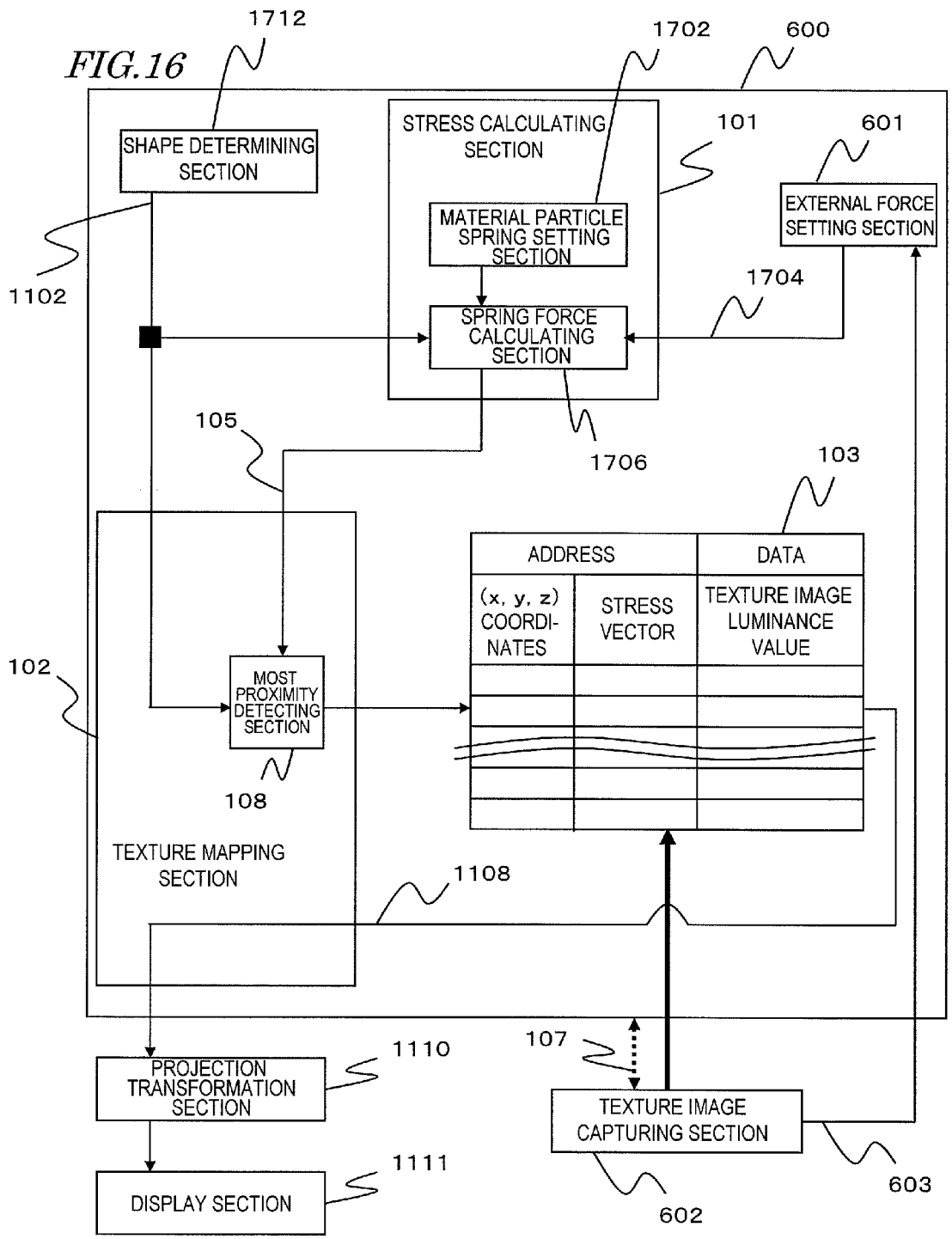
FIG. 16 is a block diagram illustrating a configuration for an image generator 600 as a second specific preferred embodiment of the present invention.

FIG. 16 is a block diagram illustrating an image generator 600 as a second specific preferred embodiment of the present invention. In FIG. 16, any component also shown in FIG. 11 and having substantially the same function as its counterpart is identified by the same reference numeral and a detailed description thereof will be omitted herein.

The image generator 600 includes the shape determining section 1712, the stress calculating section 101, an external force setting section 601, the texture mapping section 102 and the luminance value memory section 103. This image generator 600 is designed to attach a texture image, of which the luminance value has been determined based on the object shape, elasticity or external force that has been specified by the designer, to an object being deformed.

The external force setting section 601 is set in response to an external force measuring signal 603 that has been supplied from a texture image capturing section 602.

Figure 17:
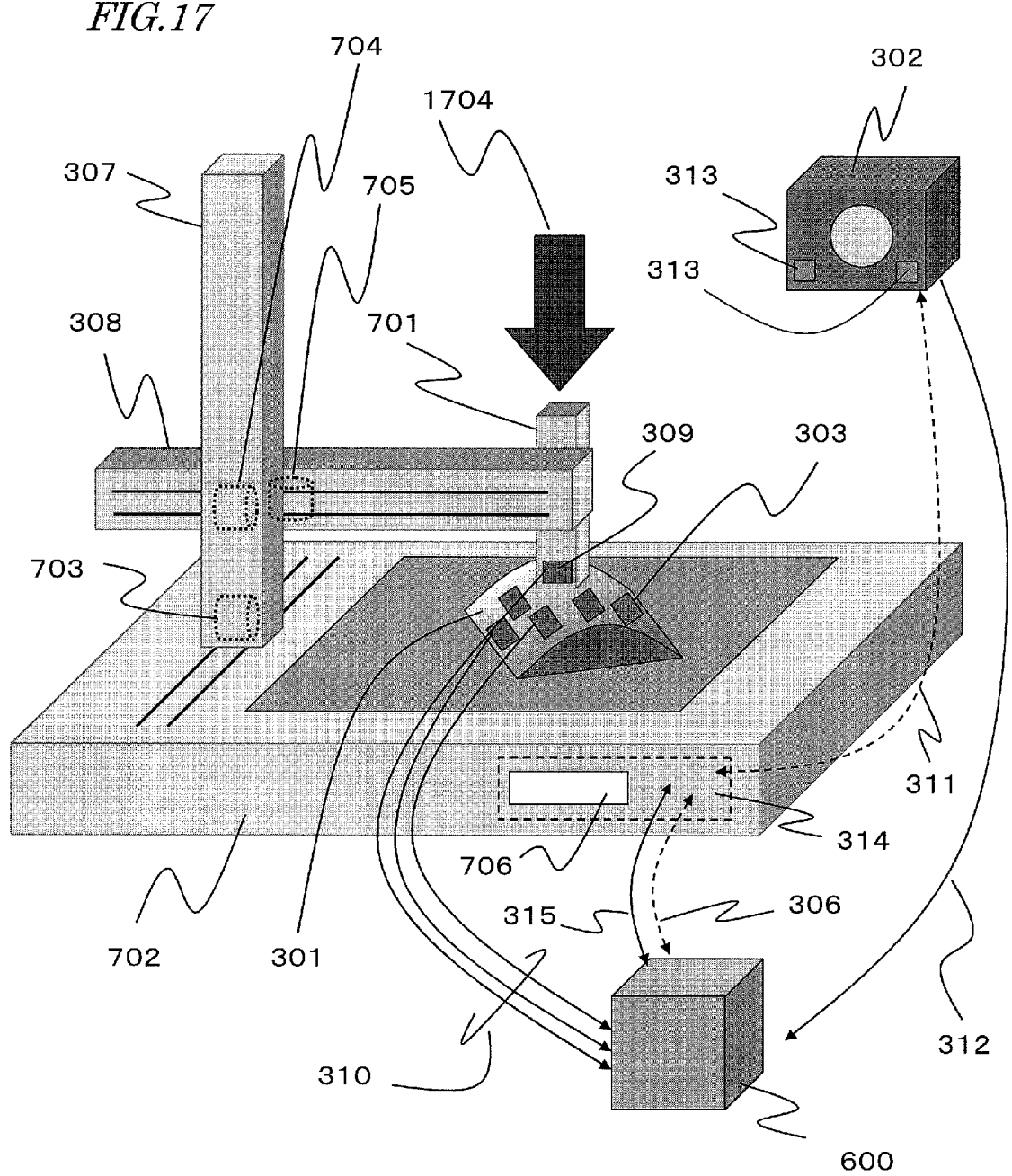
FIG. 17 illustrates an exemplary configuration for a texture image capturing section 602.

Specifically, the texture image capturing section 602 measures the external force that has been given by a person (such as a designer) to the subject and sends it to the external force setting section 601. FIG. 17 illustrates an exemplary configuration for the texture image capturing section 602 (see FIG. 16). In this preferred embodiment, the person deforms the subject 301 by moving the contact 701. The XYZ stage 702 determines the (x, y, z) coordinates of the contact 701 using encoders 703, 704 and 705 that are attached to the supporting poles 307 and 308. The (x, y, z) coordinates thus obtained are sent by the luminance value acquisition control section 314 to the image generator 600 through the data line 315. The external force vector 1704 indicating the external force that has been applied by the contact 701 to the subject 301 is determined by the strain sensors 309, and then loaded, along with the measuring data obtained by the strain sensor 303, into the image generator 600 by way of the stress data line 310. The direction of the external force vector 1704 is determined by sensing how much the contact 701 has moved.

Any arbitrary timing of shooting may be instructed. For example, the texture image capturing section 602 may be loaded continuously with the luminance values of texture images at regular intervals (e.g., 1/30 seconds). Alternatively, the texture image capturing section 602 may monitor the variations in the outputs of the strain sensors 309 and/or the rangefinder sensor 313. And if the variation in the magnitude of the stress vector or the shift in the starting point of the stress vector exceeds a predetermined reference value, the shooting instruction may be issued. If the camera 302 obtains the luminance value of the texture image by making shots according to the magnitude of the variation, then the contact 701 functions as camera's shutter release button so to speak.

Figure 18:
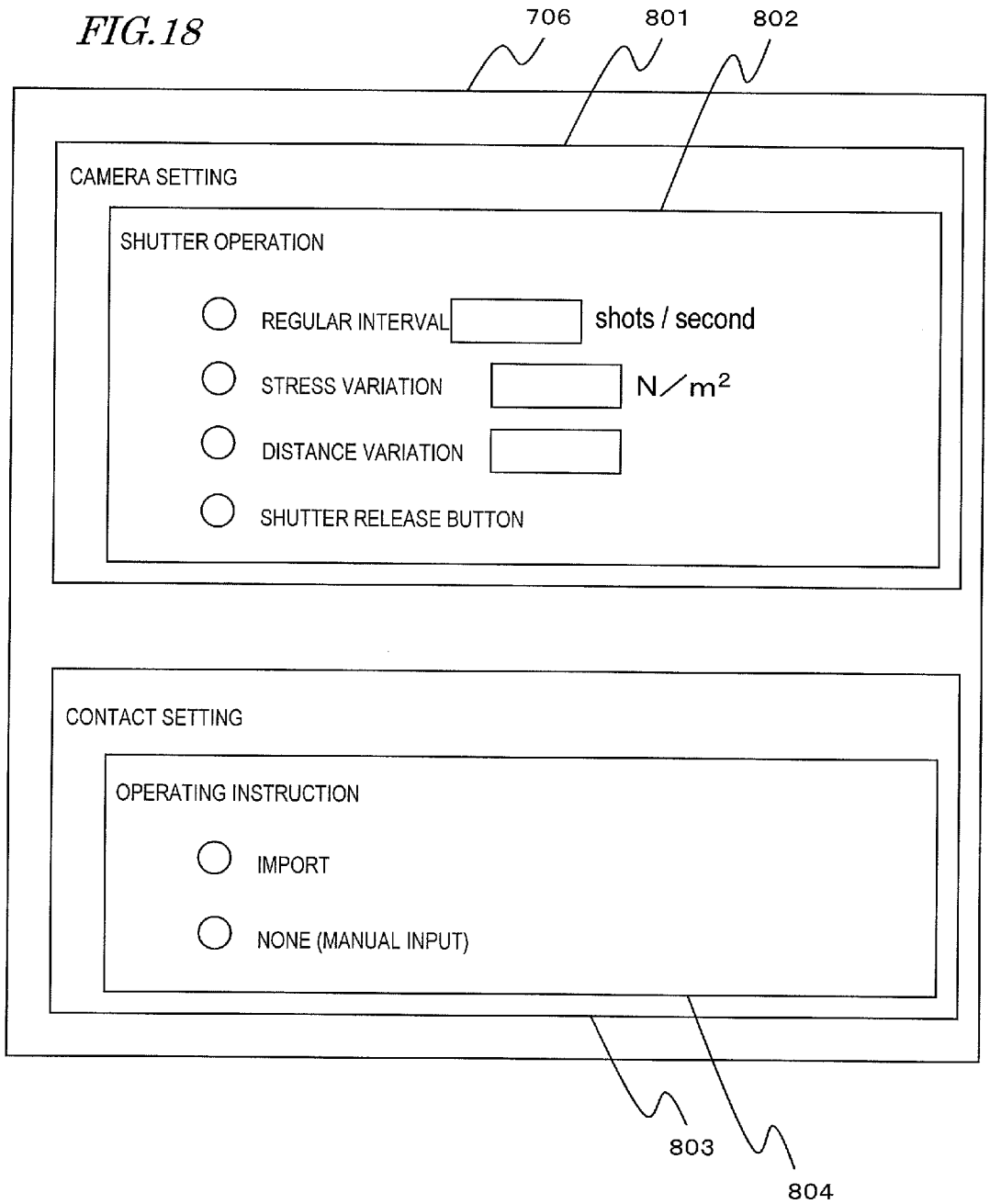
FIG. 18 illustrates what setting boxes may be displayed on the control panel 706 of a luminance value acquisition control section 314.

FIG. 18 illustrates what setting boxes may be displayed on the control panel 706 of the luminance value acquisition control section 314.

The "camera setting" box 801 shown in FIG. 18 provides a menu for controlling various settings of the camera 302. This box includes a "shutter operation" box 802, which is a menu for controlling the operation settings of the shutter of the camera 302. If the designer chooses a radio button "regular interval" using an input device such as a button (not shown), the shutter of the camera 302 shoots a series of texture images sequentially at regular time intervals, which are determined by the numbers of shots per second, in order to obtain their luminance values. On the other hand, if he or she chooses a radio button "stress variation", then the shutter of the camera 302 shoots a texture image to obtain its luminance value every time a specified amount of stress variation is measured. Furthermore, if he or she chooses a radio button "distance variation", then the measuring data obtained by the rangefinder sensor 313 is traced time sequentially. Every time a specified amount of distance variation is measured, a texture image is shot to obtain its luminance value. And if he or she presses a radio button "shutter release button", the luminance value of a texture image is obtained every time the shutter release button of the camera 302 is pressed.

On the other hand, the "contact setting" box 803 shown in FIG. 18 provides a menu for controlling settings of the contact 701. This box includes a "movement instruction" box 804, which provides a menu for determining how to move the contact. If a radio button "import" is pressed, an instruction on how to move the contact is given externally from outside of the texture image capturing section 602. The external device may be the external force setting section 601, for example. On the other hand, if a radio button "none (manual input)" is pressed, no instruction is given on how to move the contact but the user moves the contact manually with his or her hand and the XYZ stage 702 measures the contact's movement using the encoders 703, 704 and 705.

According to these techniques, the designer of computer graphics does not have to directly determine the external force vector 1704 by him- or herself but may determine the settings of the external force setting section 601 by controlling the magnitude of pressure to be applied to the subject 301 while checking out the degree of deformation of the real thing both visually and tactually alike. For example, if the same external force vector is applied to two objects with mutually different degrees of hardness, the softer object will be deformed more significantly than the harder one. The greater the degree of deformation, the greater the variation in the luminance value of the texture image. In that case, the luminance values of the texture image need to be obtained at even shorter time intervals. On the other hand, since the harder object is deformed less significantly, a smaller number of texture images may be shot to obtain their luminance values. The magnitude of deformation intended by the designer is set by the external force setting section 601 by determining the stress vector while allowing him or her to check out the magnitude of deformation of the real thing manually. Consequently, the object rendered by computer graphics can be deformed naturally just like the real thing, and a highly realistic texture can be created.

It should be noted that the method of applying external force to the subject and the method of determining the external force vector shown in FIG. 16 are only an example. Alternatively, any other arbitrary method may also be used. For example, the designer may wear gloves with strain sensors and press the subject with a number of his or her fingers. In that case, however, when external force is applied and when the external force vector is determined, something between the subject 301 and the camera 302 may block the camera 302 from shooting the subject 301 as intended to obtain its luminance value. In that case, after the external force vector 1704 and the stress vector have been determined once, the subject 301 may be separately deformed by the XYZ stage that would not block the camera's view less and a texture image may be shot with the camera 302 to obtain its luminance value as described above. In that case, if the same external force is applied to the subject, the luminance value of the texture image can be obtained without making a stress measuring sensor or any other thing hiding the subject excessively.

Embodiment 3

In an image generator according to a third preferred embodiment of the present invention to be described below, the luminance value of a texture image representing a subject that has been deformed is obtained by actually shooting, and the stress to be applied to the object as a result of the deformation is measured. And the luminance value of the texture image is obtained using the coordinates of the polygon, to which the texture is going to be attached, and the stress as an address. Specifically, in this preferred embodiment, the external force that applied deformation to the object is applied by an input device that is provided separately from the image generator.

Figure 19:
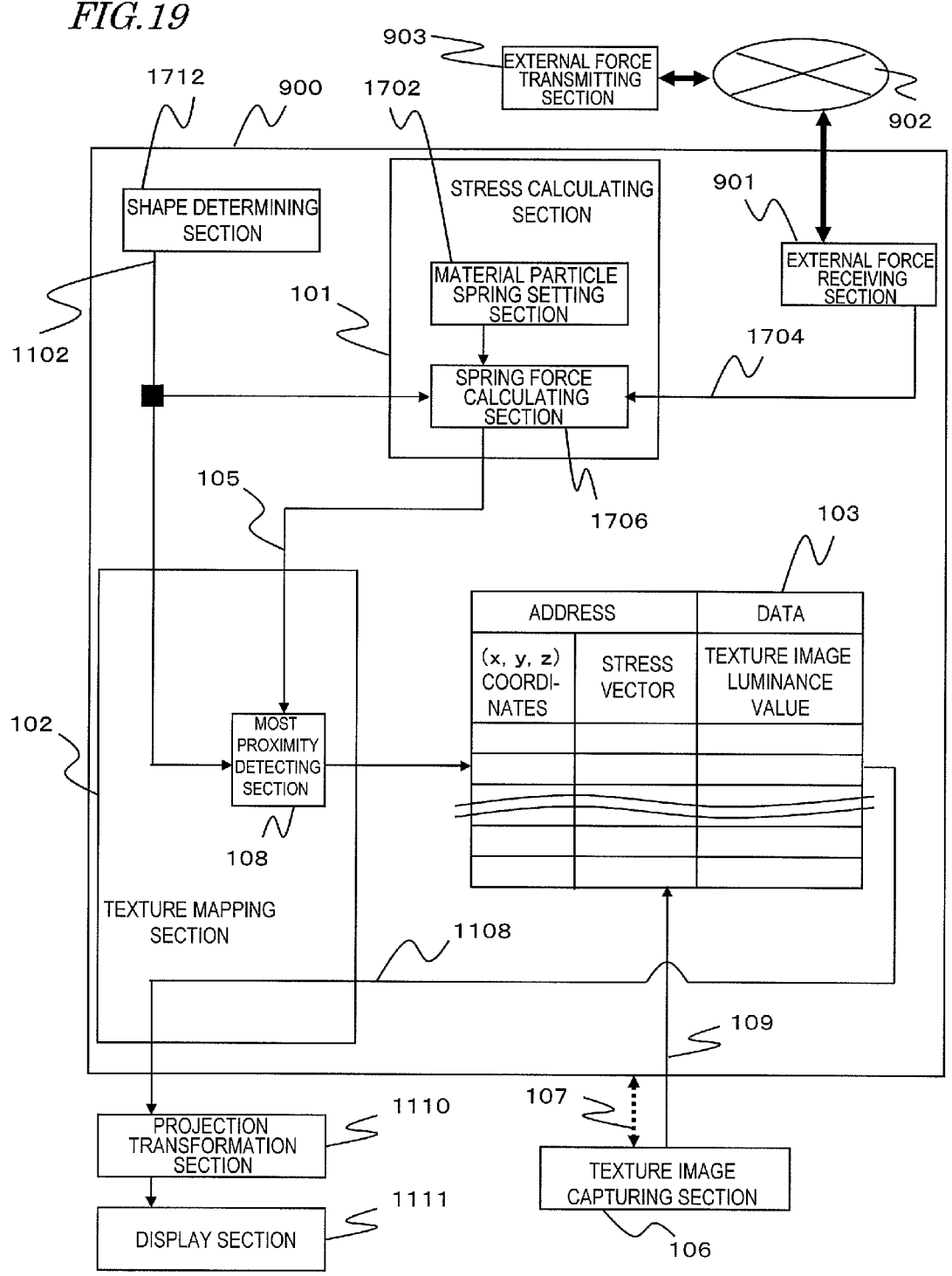
FIG. 19 is a block diagram illustrating a configuration for an image generator 900 as a third specific preferred embodiment of the present invention.
Figure 20:
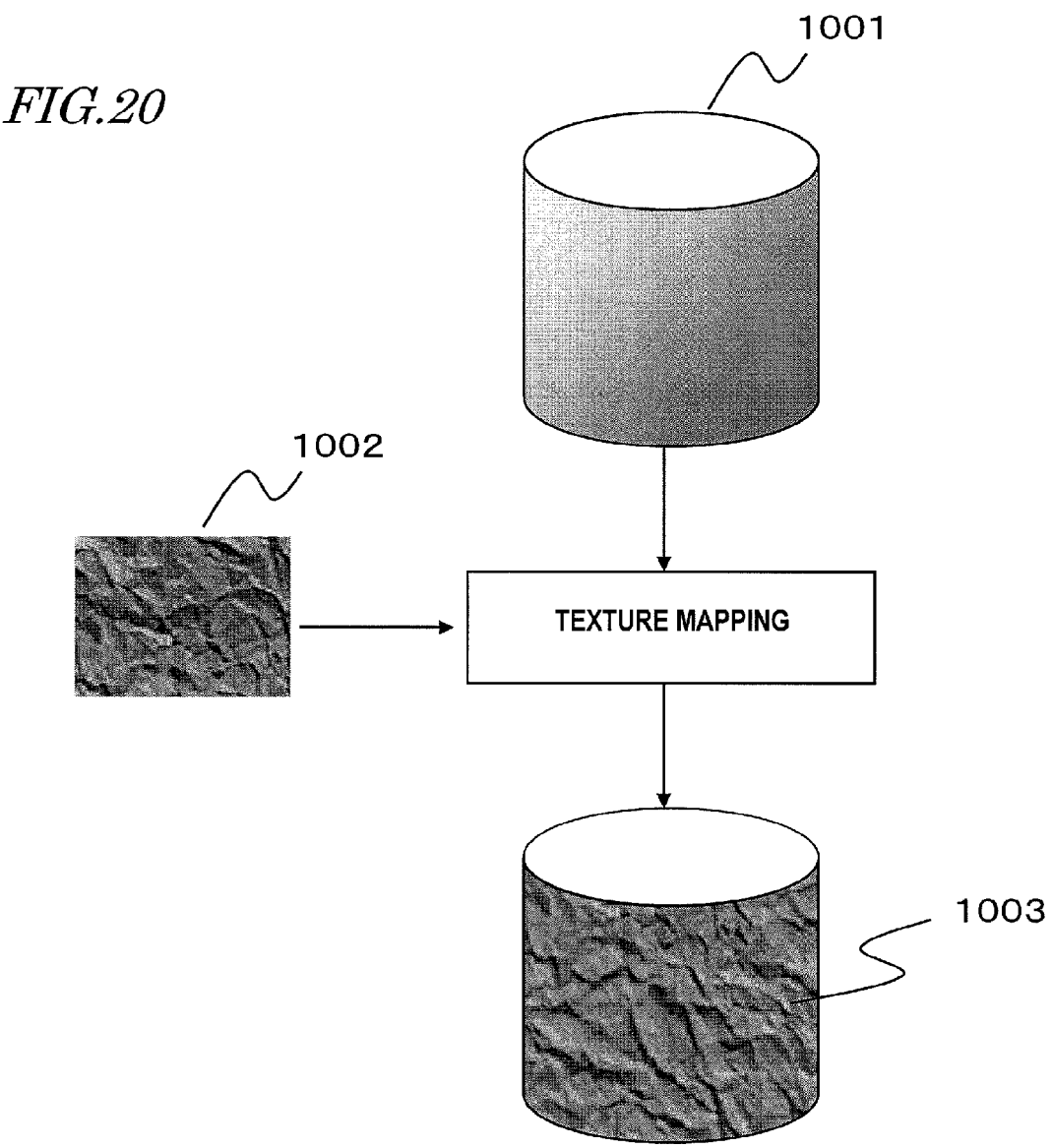
FIG. 20 illustrates how to perform texture mapping on a two-dimensional image.

FIG. 19 is a block diagram illustrating an image generator 900 as a third specific preferred embodiment of the present invention. In FIG. 19, any component also shown in FIG. 11 and having substantially the same function as its counterpart is identified by the same reference numeral and a detailed description thereof will be omitted herein.

The image generator 900 includes the shape determining section 1712, the stress calculating section 101, an external force receiving section 601, the texture mapping section 102 and the luminance value memory section 103. This image generator 900 is designed to attach a texture image, of which the luminance value has been determined based on the object shape or elasticity that has been specified by the designer, to an object being deformed. In this case, the external force that applies deformation to the object is received from outside of this image generator 900.

The external force receiving section 901 receives an external force vector 1704 from an external force transmitting section 903 over a network 902. The external force transmitting section 903 may either obtain the external force vector 1704 from a pre-programmed external force generating model and transmit it or just send the measuring data obtained by strain sensors.

Specifically, such an external force generation model is supposed to be generated based on computations by computers in order to communicate force sense information to a distant location over a network.

In general, the external force generation model is defined on a cell-by-cell basis by dividing a given object into a great many small cells as in the finite element method. A model parameter (such as its modulus of elasticity) is also set on a cell-by-cell basis and the object's shape is determined as the total sum of those parameters. That is why since model parameters need to be set for that huge number of cells, an enormous amount of computations should usually be done and bulky computational resources should be consumed. That is why this image generator 900 is dedicated to texture mapping and leaves it to an external device outside of it as for setting the external force vector 1704, which would otherwise impose a lot of computational load on it.

According to the finite element method, for example, a huge computational load would be imposed because it is necessary to calculate how much force is applied to each element in various situations. For that reason, computations that will impose such a heavy load may get done by an external computer outside of the image generator 900, and then the results of those computations, representing how to apply the external force, may be loaded into the image generator 900.

If strain sensors are used as the external force transmitting section 903, those sensors may be attached to the input device of a video game console, for example. In that case, the video game image will be displayed on the display section 1111 and the player of the video game may enter various game play related actions through the strain sensors in his or her hand while watching the video game image on the screen. For instance, if the player wants to enter the action of crushing an object, he or she will press the strain sensors in his or her hand against the table, thereby entering more external force into the image generator 900 from the external force transmitting section 903. In response, the image generator 900 instructs the stress calculating section 101 calculate a stress signal 105 based on the external force vector 1704 that has been received by the external force receiving section 901 and then makes the texture mapping section 102 map the luminance value of the texture image, which has changed due to the deformation, to the object shape.

Although the present invention is supposed to be applied to a video game console in the foregoing description, this is just an example, and the present invention is also applicable to the medical field as well. For example, if the hardness of a subject's organ is measured with strain sensors that are attached to an endoscope, the deformation of the organ may be rendered by computer graphics and checked out by the physician with his or her own eyes by looking at the display section 1111. In any case, if the user cannot directly reach the subject due to some constraint because the subject is in a distant location, or inside a person's body, or in an inaccessible danger zone, the external force transmitting section 903 may be cut off from the image generator 900.

As described above, if the subject is out of reach of the user, the luminance value of the texture image cannot be obtained from the subject itself. That is why in that case, the texture image capturing section 106 provides a replacement subject, shoots it, obtains its measuring data, and then stores necessary information in the luminance value memory section 103. For example, if the deformation of a subject's organ is going to be rendered with an endoscope, such a replacement can be provided in advance because it is already known that the texture is an organ. Alternatively, video that was shot in the past could also be used to determine the luminance value of the texture image as well. In the case of a video game, every game picture to be rendered needs to be prepared in advance and stored in the luminance value memory section 103.

Even if the given external force vector 1704 cannot be found anywhere in the luminance value memory section 103, the most proximity detecting section 108 can detect the closest stress vector. That is why the texture mapping process never stops even in that situation but rendering can be continued with some texture image luminance value attached to the object shape. If the degree of reality of the image rendered on the display section 1111 needs to be increased, the replacement subject provided needs to be as close to the object as possible and the luminance value of the texture image is added by the texture image capturing section 106.

The network 902 may not only be a wide area network such as the Internet but also be a personal local area network such as a USB (universal serial bus) or Bluetooth that connects a computer to a peripheral device. Still alternatively, a function equivalent to the network 902 can also be performed even by using an SD (secure digital) memory card or any other storage medium. That is to say, according to this preferred embodiment, there is no need to use any particular device connecting means but any arbitrary means may be adopted.

As described above, if texture mapping can get done by receiving an external force vector 1704 that has been defined outside of the image generator 900 and if the luminance value of a texture image representing the object can be prepared in advance in the luminance value memory section 103, highly realistic computer graphics can be generated.

The operation of the image generator of the preferred embodiments described above can be performed by making the computer (processor) built in the image generator execute a computer program that is stored in a RAM (not shown). That is to say, the image generator performs the operations described above in accordance with such a computer program. For example, the image generator 100 of the first preferred embodiment described above may operate in accordance with a computer program that defines the processing steps S502 through S506 shown in FIG. 15. Such a computer program may be circulated on the market as a product by being stored on a storage medium such as a CD-ROM or downloaded over telecommunications lines such as the Internet. Alternatively, the operation of the image generator described above may also be performed by a piece of hardware such as a DSP by installing a computer program in a semiconductor circuit.

By applying any of various preferred embodiments of the present invention described above, video can be represented with a lot more power of expression.

In addition, an actual shot of the real thing, which cannot but be used in the prior art to make a picture, can now be replaced with computer graphics according to the present invention, and therefore, various physical constraints on shooting, including weather and location, can be eliminated. On top of that, even if video needs to be produced from an angle at which it would be dangerous to make an actual shot, such video may be produced easily by using computer graphics.

INDUSTRIAL APPLICABILITY

As described above, the present invention contributes immensely to increasing the degree of reality of computer graphics, which are currently often used in making not only movies but also ads on TV, the Internet, magazines and various other media or merchandize catalogs, and enhancing the power of expression of the video and its advertising effect as well. Among other things, if computer graphics are used to make a moving picture that can render a deformation, a highly realistic texture can be represented using an actual shot that captures that deformation, thus possibly leading to a surge in the number of computer graphics users.

REFERENCE SIGNS LIST

100 image generator
101 stress calculating section
102 texture mapping section
103 luminance value memory section
108 most proximity detecting section
1110 projection transformation section
1111 display section
1702 material particle spring setting section
1703 external force setting section
1706 spring force calculating section
1712 shape determining section

The invention claimed is:

1. An image generating system for determining respective luminance values of multiple polygons which represents a surface of a subject that is an object to be rendered by reference to a texture image attached to the multiple polygons, the system comprising:
    a capturing section for storing data about a texture image of an object that has been deformed by external force;
    a memory section for retaining a table of correspondence in which for each of multiple polygons, associated with each other are: position information about a position of one polygon which is set corresponding to a position on a surface of the object, to which no external force is applied; information about a stress vector which indicates external force applied to the position on the surface of the object and which is associated with the one polygon corresponding to the position on the surface of the object, to which external force is applied; and information about the luminance value of the texture image of the object, to which the external force is applied; and
    a texture mapping section for making reference to the table with the position information of the polygon corresponding to the position on the surface of the object, to which no external force is applied, and the information about the stress vector indicating a stress to act on the object.

2. The image generating system of claim 1, wherein the capturing section further measures the external force, and
    wherein the texture mapping section calculates, based on the external force measured, the stress vector indicating external force applied to the position on the surface of the object and to make reference to the table with.

3. The image generating system of claim 2, wherein while keeping the external force applied to the subject constant, the capturing section determines the stress vector and captures the texture image separately.

4. The image generating system of claim 1, wherein the capturing section captures the texture image of the object that has been deformed by the external force to obtain data about the texture image, and determines magnitude and starting point of the stress vector which is associated with the one polygon and which indicates the external force applied to the object, thereby generating information about the stress vector, and
    wherein the memory section stores the information about the stress vector on the table.

5. The image generating system of claim 4, further comprising:
- a shape determining section for setting multiple polygons to represent the three-dimensional shape of the object;
- a stress calculating section for calculating the stress vector produced responsive to the external force applied; and
- a detecting section for determining the luminance value of the texture image, of which the address is closest to that of the stress vector, by the position information about the position of each said polygon and the stress vector determined by the external force applied to the position on the surface of the object, which corresponds to the position of the one polygon,
- wherein the table of the memory section retains, as an address, the magnitude and starting point of the stress vector and the memory section outputs the luminance value of the texture image as the luminance value of the polygon.

6. The image generating system of claim 5, wherein the strain sensor is arranged in contact with the object to measure the external force, and
- wherein the stress calculating section receives information about the external force measured and calculates the stress vector from the external force applied to the position on the surface of the object, which corresponds to the position of the one polygon.

7. The image generating system of claim 5, wherein the stress calculating section calculates the stress vector by a model that uses material particles, which have been set on a polygon-by-polygon basis, and spring elasticities connecting those material particles together.

8. The image generating system of claim 5, wherein while keeping the external force applied to the subject constant, the capturing section determines the stress vector and captures the texture image separately.

9. The image generating system of claim 4, wherein the capturing section includes a strain sensor and a rangefinder sensor, and
- wherein the strain sensor determines the magnitude of the stress vector, and
- wherein the rangefinder sensor determines the starting point of the stress vector.

10. The image generating system of claim 9, wherein if either a variation in the magnitude of the stress vector has exceeded a predetermined value or a shift of the starting point of the stress vector has exceeded a predetermined reference value, the capturing section captures the texture image.

11. The image generating system of claim 9, wherein while keeping the external force applied to the subject constant, the capturing section determines the stress vector and captures the texture image separately.

12. The image generating system of claim 4, wherein while keeping the external force applied to the subject constant, the capturing section determines the stress vector and captures the texture image separately.

13. The image generating system of claim 1, wherein while keeping the external force applied to the object constant, the capturing section determines the stress vector and captures the texture image separately.

14. The image generating system of claim 1, further comprising a projection transformation section that changes the luminance value of the texture image to be applied to the polygon in accordance with the information about the luminance value that has been obtained by making reference and that outputs the texture image.

15. A method for use in an image generating system for determining respective luminance values of multiple polygons which represents a surface of a subject that is an object to be rendered by reference to a texture image attached to the multiple polygons, the method comprising the steps of:
- providing data about a texture image of an object that has been deformed by external force;
- drawing up a table of correspondence in which for each of multiple polygons, associated with each other are: position information about a position of one polygon which is set corresponding to a position on a surface of the object, to which no external force is applied; information about a stress vector which indicates external force applied to the position on the surface of the object and which is associated with the one polygon corresponding to the position on the surface of the object, to which external force is applied; and information about the luminance value of the texture image of the object, to which the external force is applied;
- making reference to the table with the position information of the polygon corresponding to the position on the surface of the object, to which no external force is applied, and the information about the stress vector indicating a stress to act on the object; and
- changing the luminance value of the texture image to be applied to the polygon in accordance with the information about the luminance value that has been obtained by making reference, thereby outputting the texture image.

16. A computer program, stored on a non-transitory computer-readable medium, to be executed by a computer of an image generating system for determining respective luminance values of multiple polygons which represents a surface of a subject that is an object to be rendered by reference to a texture image attached to the multiple polygons,
- wherein the computer program is defined to make the computer perform the steps of:
- obtaining data about a texture image of an object that has been deformed by external force;
- drawing up a table of correspondence in which for each of multiple polygons, associated with each other are: position information about a position of one polygon which is set corresponding to a position on a surface of the object, to which no external force is applied; information about a stress vector which indicates external force applied to the position on the surface of the object and which is associated with the one polygon corresponding to the position on the surface of the object, to which external force is applied; and information about the luminance value of the texture image of the object, to which the external force is applied;
- making reference to the table with the position information of the polygon corresponding to the position on the surface of the object, to which no external force is applied, and the information about the stress vector indicating a stress to act on the object; and
- changing the luminance value of the texture image to be applied to the polygon in accordance with the information about the luminance value that has been obtained by making reference, thereby outputting the texture image.

* * * * *